United States Patent [19]
Fukuawa et al.

[11] Patent Number: 5,436,928
[45] Date of Patent: Jul. 25, 1995

[54] METHOD AND APPARATUS FOR EQUALIZING TRANSMISSION LINE CHARACTERISTICS WHICH VARY AT HIGH SPEED IN MOBILE RADIO COMMUNICATION

[75] Inventors: Kazuhiko Fukuawa, Yokosuka; Hiroshi Suzuki, Yokosuka, both of Japan

[73] Assignee: Nippon Telegraph and Telephone Corporation, Tokyo, Japan

[21] Appl. No.: 863,444

[22] Filed: Apr. 3, 1992

[30] Foreign Application Priority Data

| Apr. 8, 1991 | [JP] | Japan | 3-075396 |
| Apr. 8, 1991 | [JP] | Japan | 3-075397 |
| Apr. 9, 1991 | [JP] | Japan | 3-076578 |
| May 31, 1991 | [JP] | Japan | 3-129984 |
| Oct. 18, 1991 | [JP] | Japan | 3-297934 |
| Mar. 9, 1992 | [JP] | Japan | 4-050929 |
| Mar. 9, 1992 | [JP] | Japan | 4-050930 |

[51] Int. Cl.⁶ .......... H03H 7/30; H03D 1/04; H04L 27/06
[52] U.S. Cl. .......... 375/232; 375/341; 375/346; 364/724.2
[58] Field of Search ...... 375/99, 100, 14, 40, 375/94, 39, 58, 12; 455/132; 364/724.19, 724.20; 333/18, 28 R

[56] References Cited

U.S. PATENT DOCUMENTS 4,884,272 11/1989 McConnell .......... 371/43
5,191,598 3/1993 Backstrom et al. .......... 375/94

FOREIGN PATENT DOCUMENTS

0434040A2 6/1991 European Pat. Off. .
0436101A3 7/1991 European Pat. Off. .
0453814A2 10/1991 European Pat. Off. .

OTHER PUBLICATIONS

J. G. Proakis: "Digital Communications," (Second Edition), 1989, McGraw-Hill, New York, pp. 610–627, Maximum-Likelihood Sequence Estimation for Detection of ISI-Corrupted Signals and CPM Signals, pp. 642–648, Recursive Least-Squares Algorithms for Adaptive Equalization.

2nd IEE National Conference on Telecommunications, 1989, New York, pp. 61–66, IEE, London, G.B. L. B. Lopes: Performance of Viterbi Equalisers for the GSM System.

38th IEEE Vehicular Technology Conference, 1988, Pennsylvania, pp. 377–384, IEEE, New York, A. Baier et al, "Bit Synchronization and Timing Sensitivity in Adaptive Viterbi Equalizers for Narrowband-TDMA Digital Mobile Radio Systems".

(List continued on next page.)

*Primary Examiner*—Stephen Chin
*Assistant Examiner*—Tesfaldet Bocure
*Attorney, Agent, or Firm*—Frishauf, Holtz, Goodman & Woodard

[57] ABSTRACT

In an apparatus for equalization in an impulse response of mobile transmission which varies fast in mobile radio communication, a signal generating circuit outputs a signal sequence undergoing transition at a predetermined period and corresponding to each state transition and a signal sequence corresponding to the path of each state transition. An adaptive filter receives the signal sequence corresponding to each state transition and outputs an estimated signal for each state transition. The apparatus also includes state estimating circuits for performing state estimation by using the square of an estimation error obtained by subtracting each estimated signal from a sampled signal, and a control circuit for controlling the tap coefficient of the adaptive filter by using the RLS algorithm in order to minimize the square of the estimation error.

14 Claims, 20 Drawing Sheets

OTHER PUBLICATIONS

IEEE Global Telecommunications Conference Globecom, 1990, San Diego, vol. 2, pp. 1127–1131, T. Sakai et al, "Soft–Decision Viterbi Decoding with Diversity Combining".

Electronics Letters, vol. 26, No. 134, Sep. 1990, London, pp. 1572–1573, E. Dahlmann, "New Adaptive Viterbi Detector for Fast–Fading Mobile–Radio Channels".

IEEE Global Telecommunications Conference Globecom 1991, Phoenix, vol. 1, pp. 548–552, IEEE, New York, K. Fukawa et al Adaptive Equalization with RLS–MLSE for Frequency–Selective Fast Fading Mobile Radio Channels.

Digital Communications (Second Edition), McGraw-Hill, 1983 John G. Proakis, Ph.D.–pp. 624–627.

IEEE Transactions on Information Theory, May 1972, vol. IT–18, No. 3, "Maximum–Likelihood Sequence Estimation of Digital Sequences in the Presence of Intersymbol Interference," G. David Forney, Jr.—pp. 363–379.

IEEE Transactions on Communications, May 1974, vol. COM–22, No. 5, "Adaptive Maximum–Likelihood Receiver for Carrier–Modulated Data–Transmission Systems", Gottfried Ungerboeck, pp. 624–635.

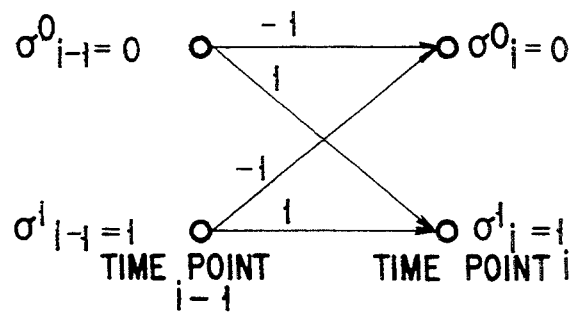
F I G. 3

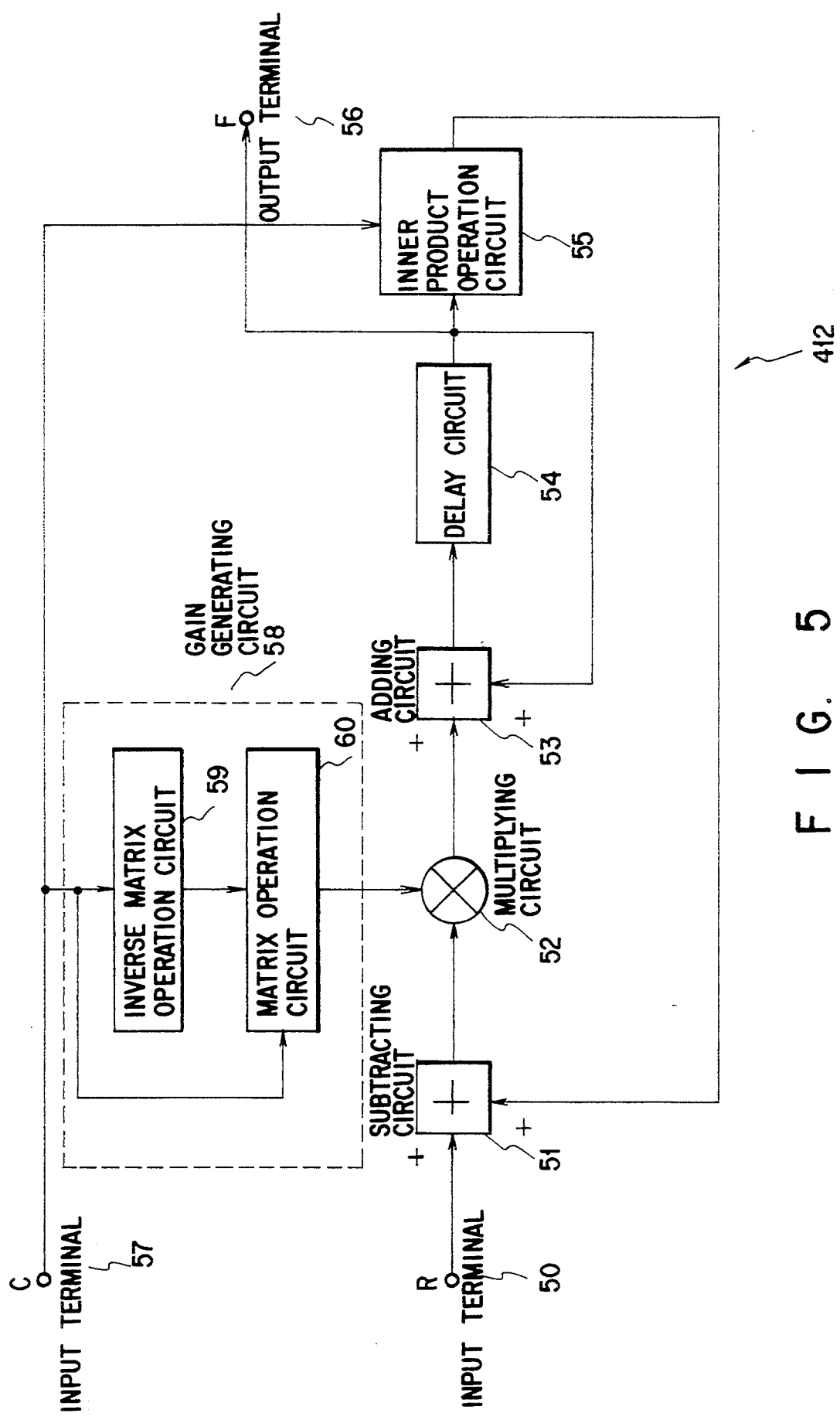
F I G. 5

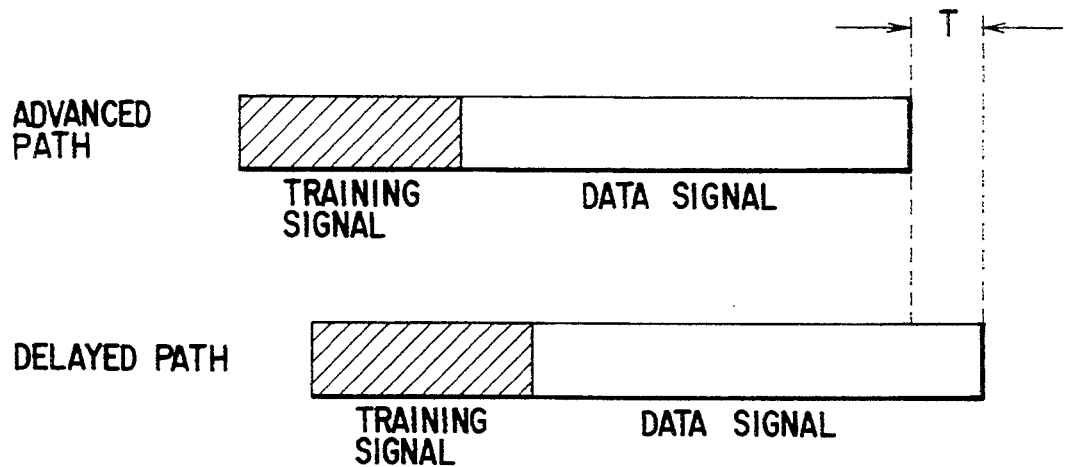
F I G. 6
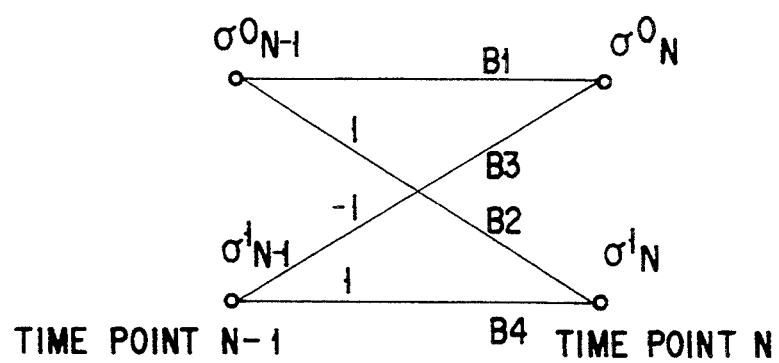
F I G. 7

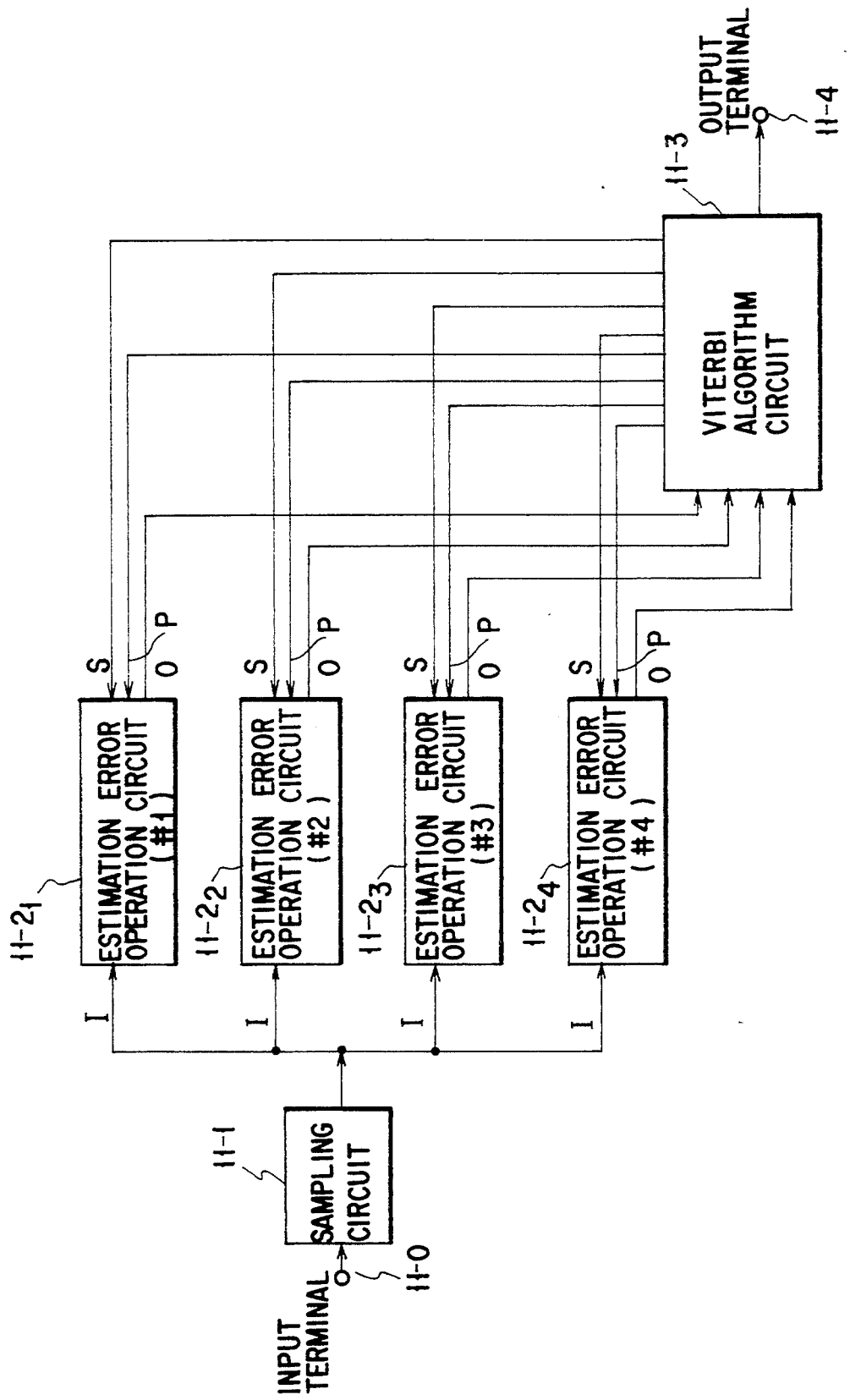
F I G. 11

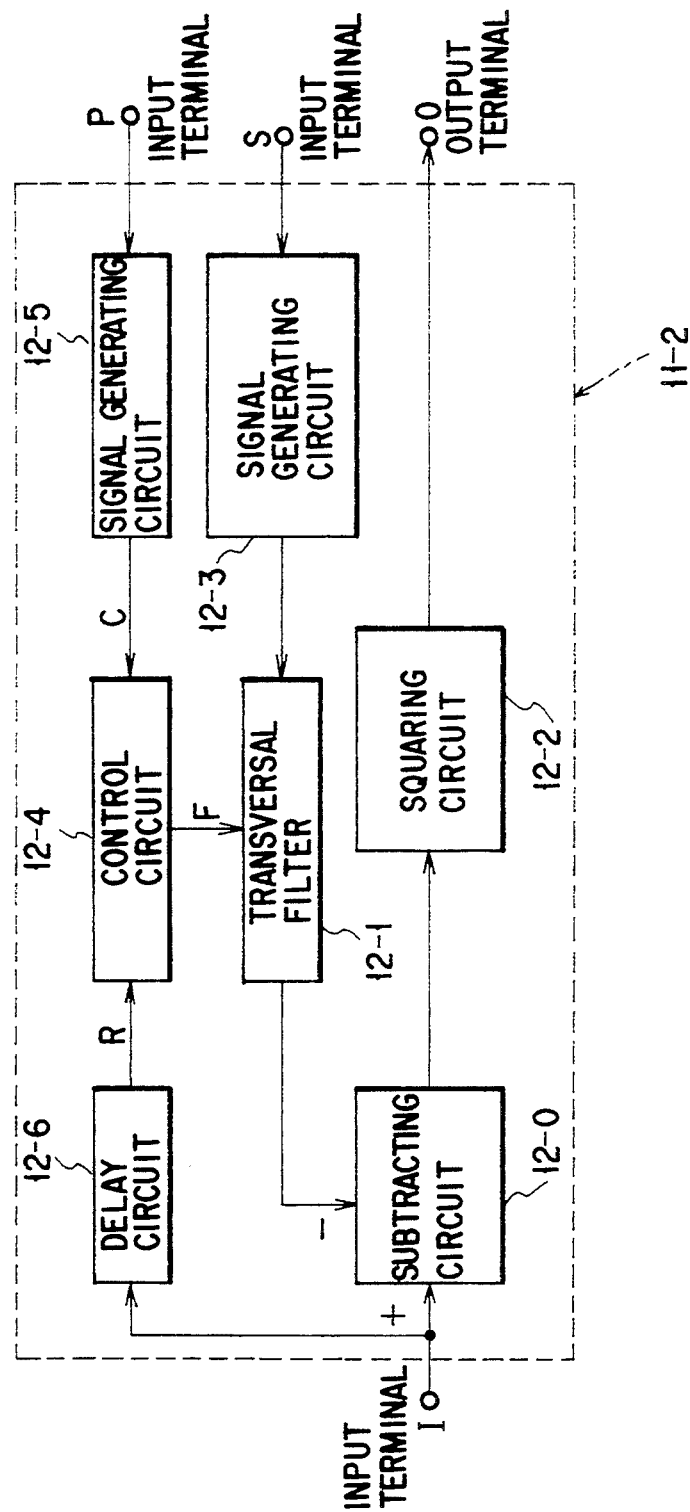
F I G. 12

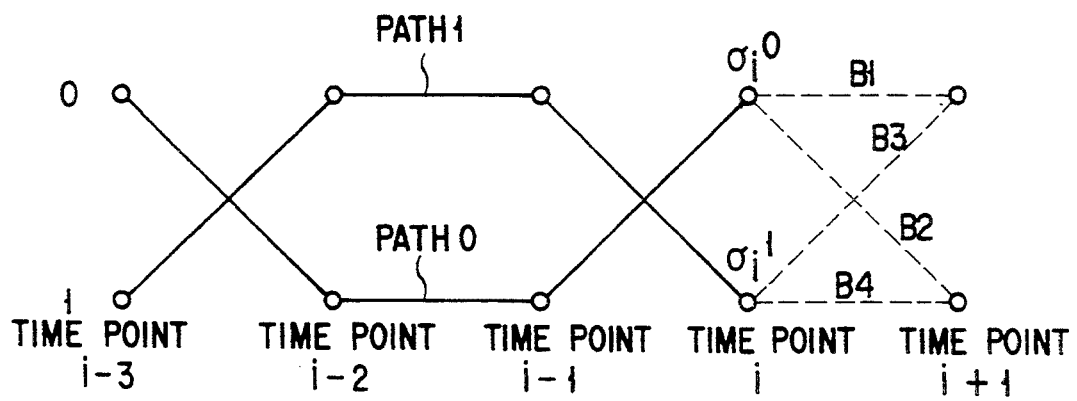
F I G. 13
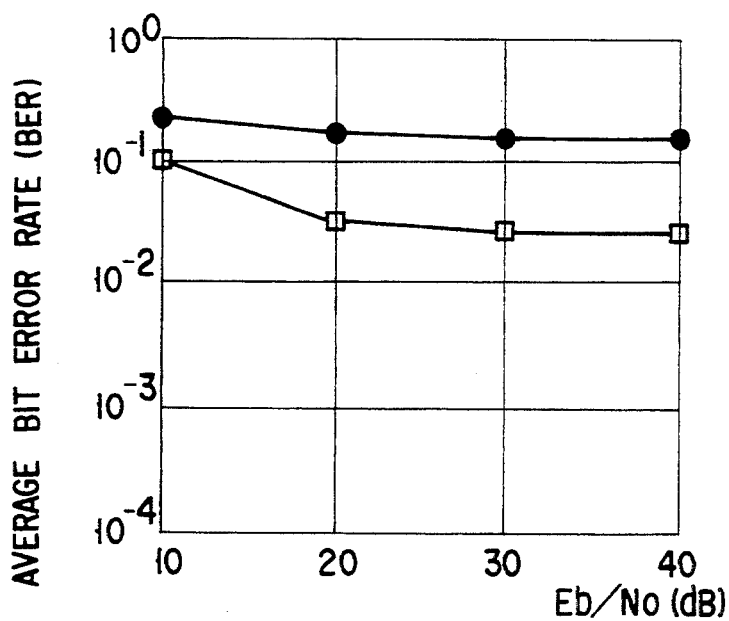
F I G. 14

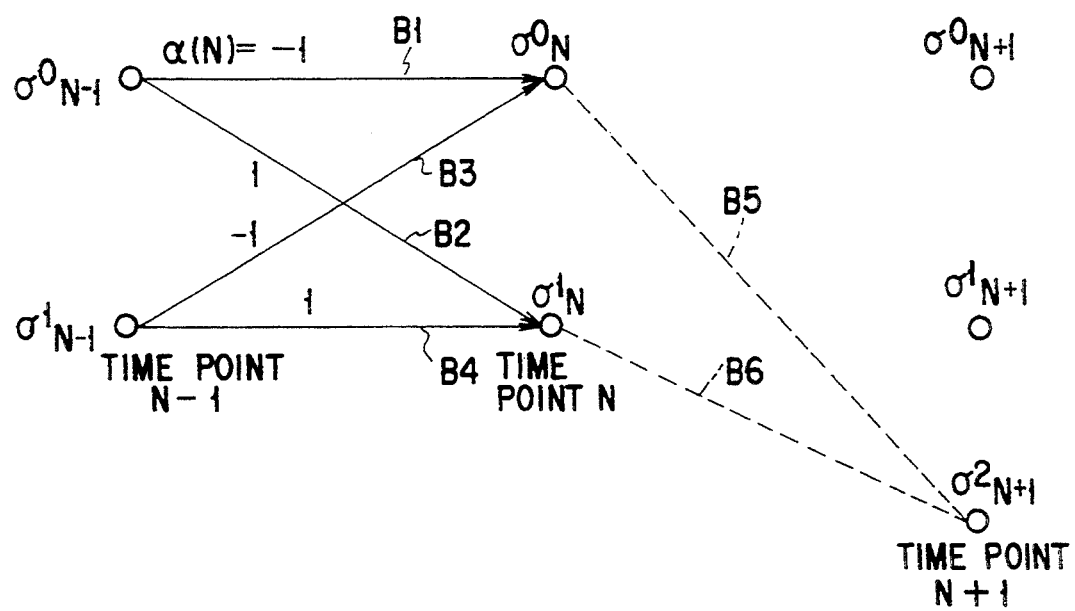
F I G. 17
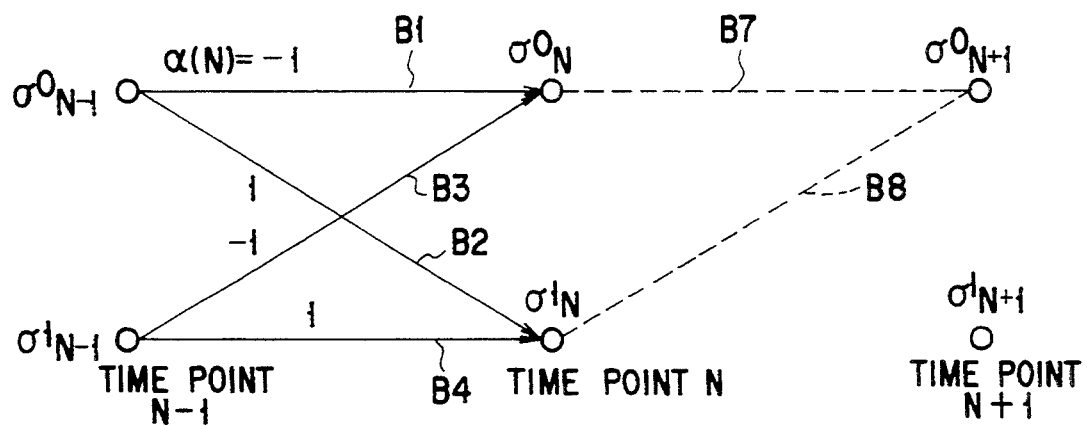
F I G. 18

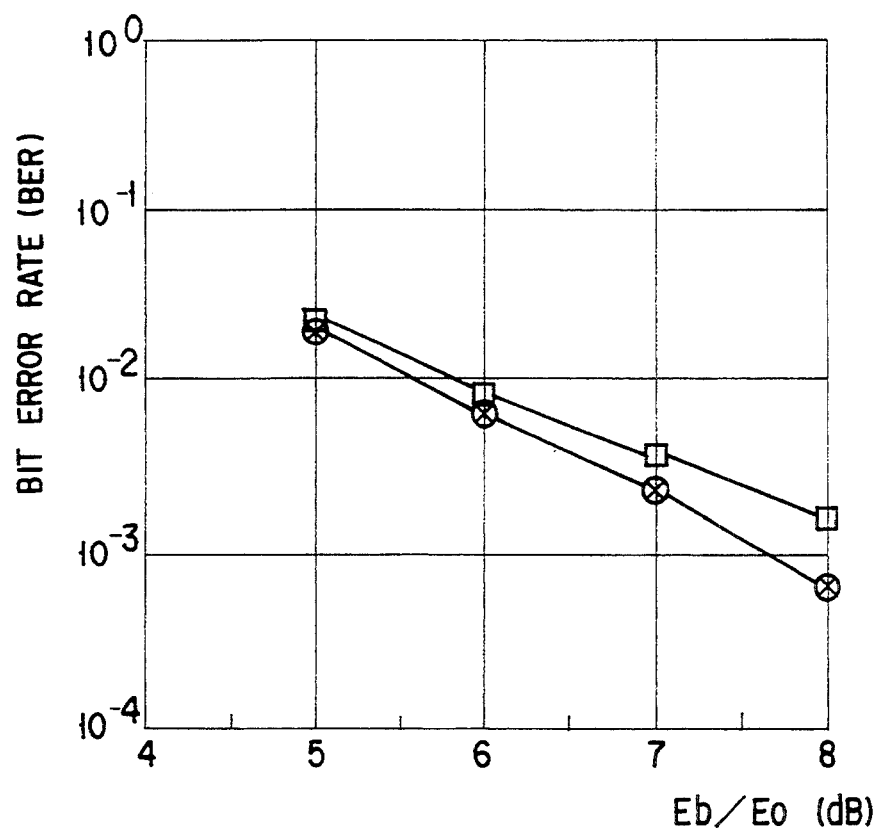
F I G. 19

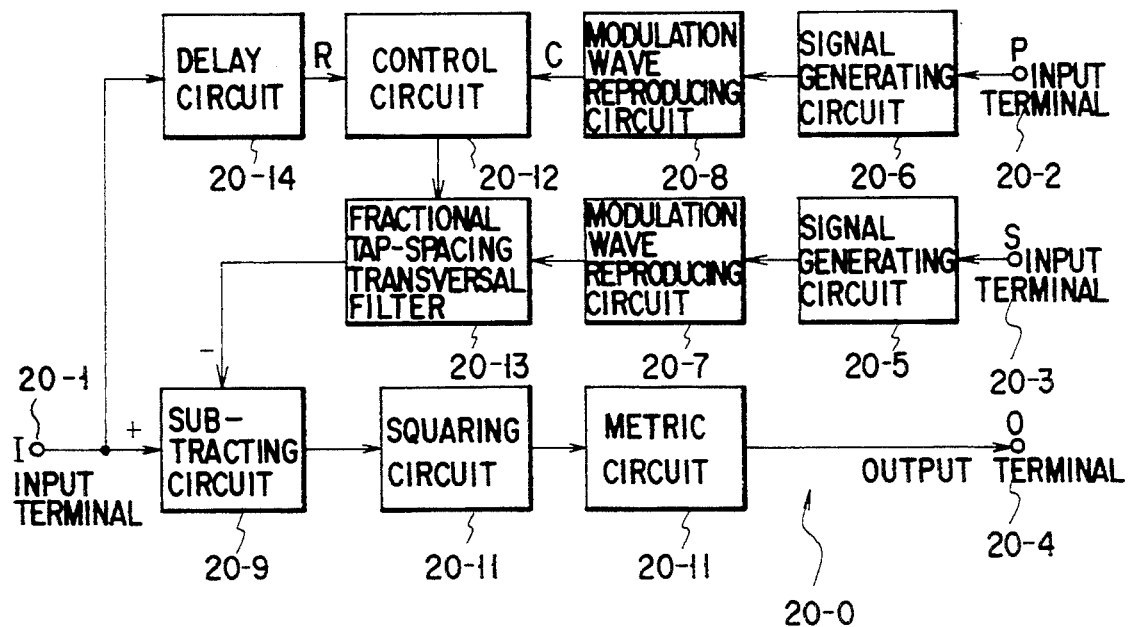
F I G. 20
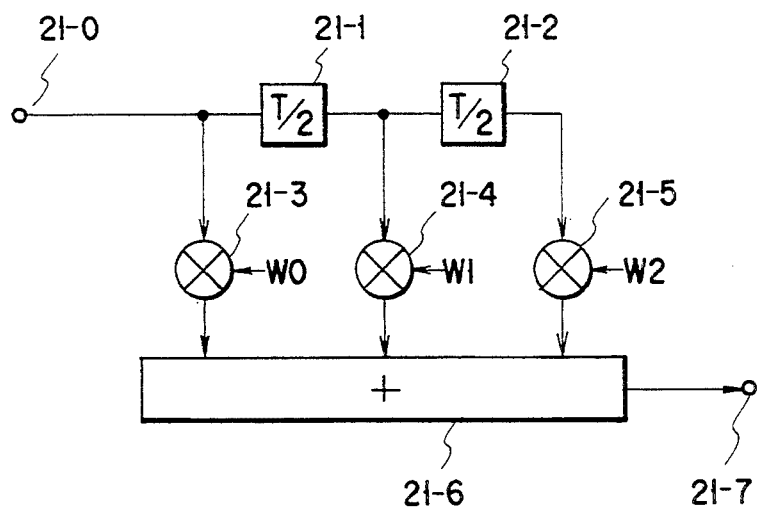
F I G. 21

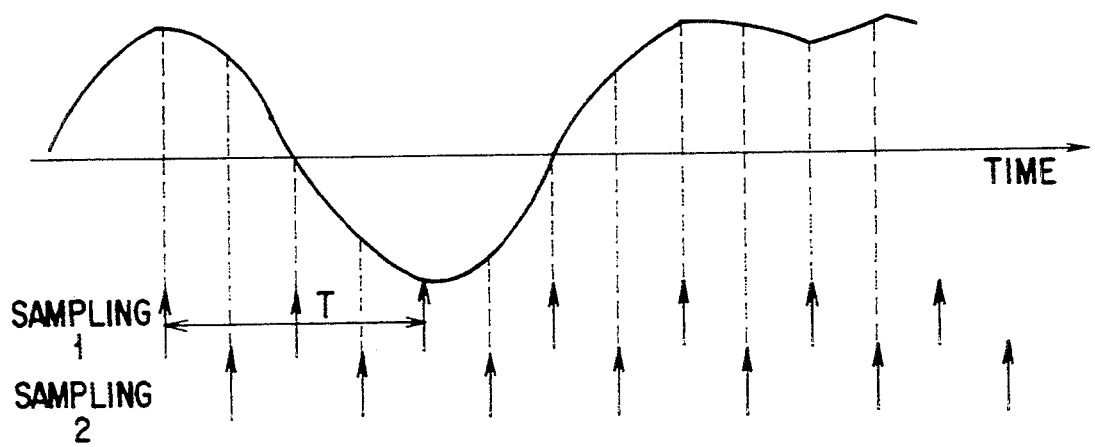
F I G. 22
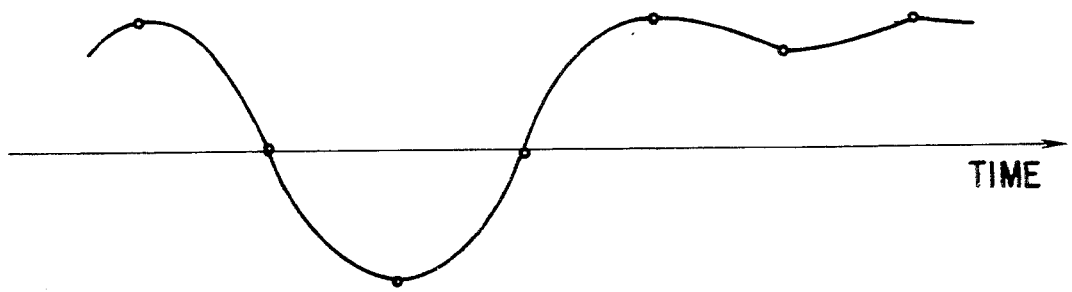
F I G. 23
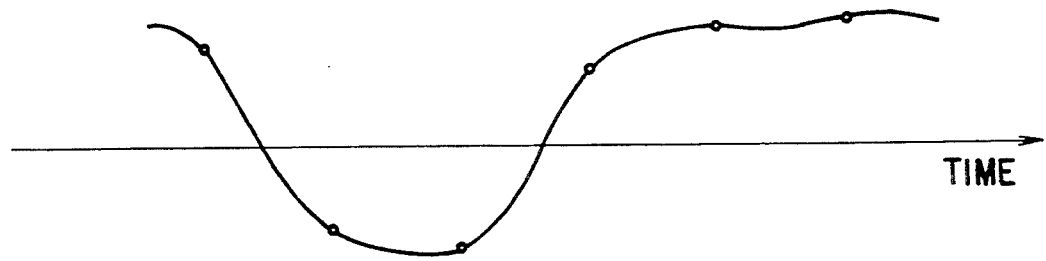
F I G. 24

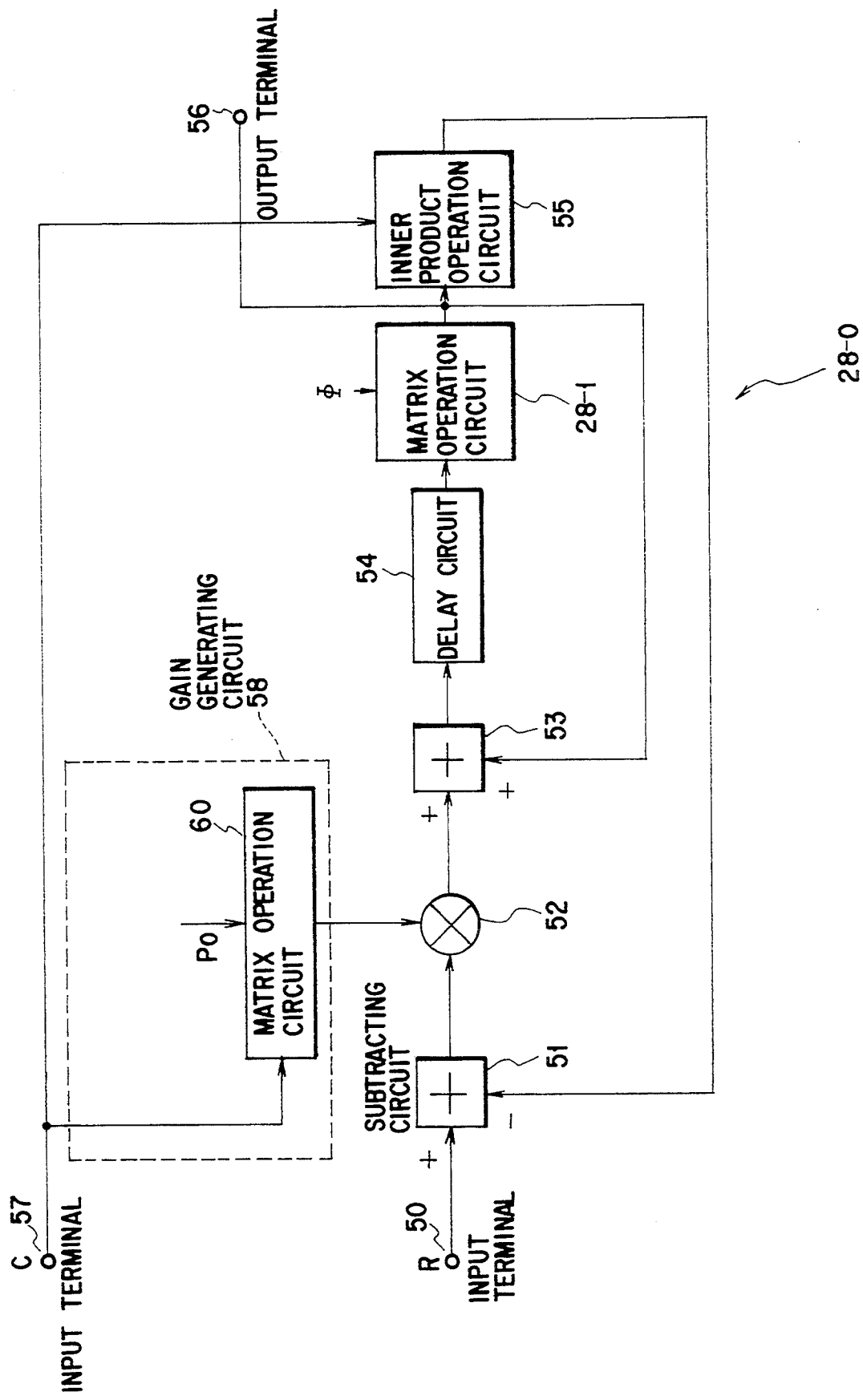
F I G. 28

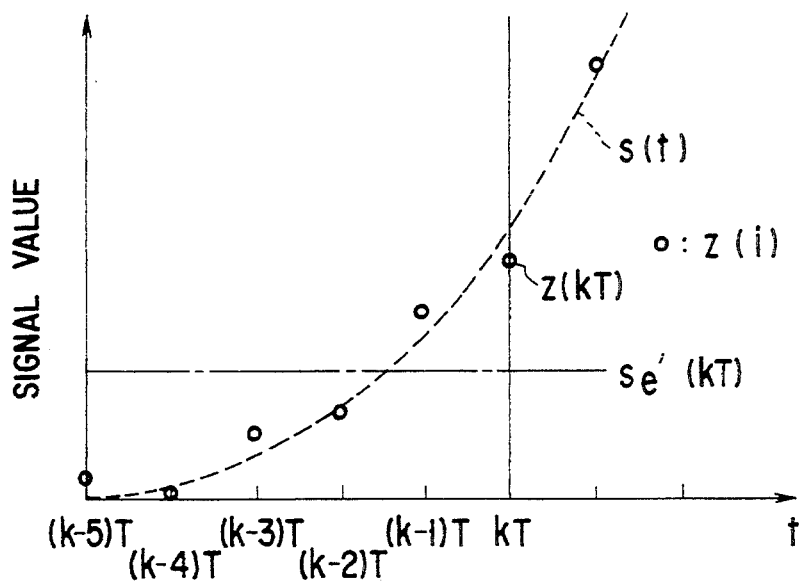
F I G. 29
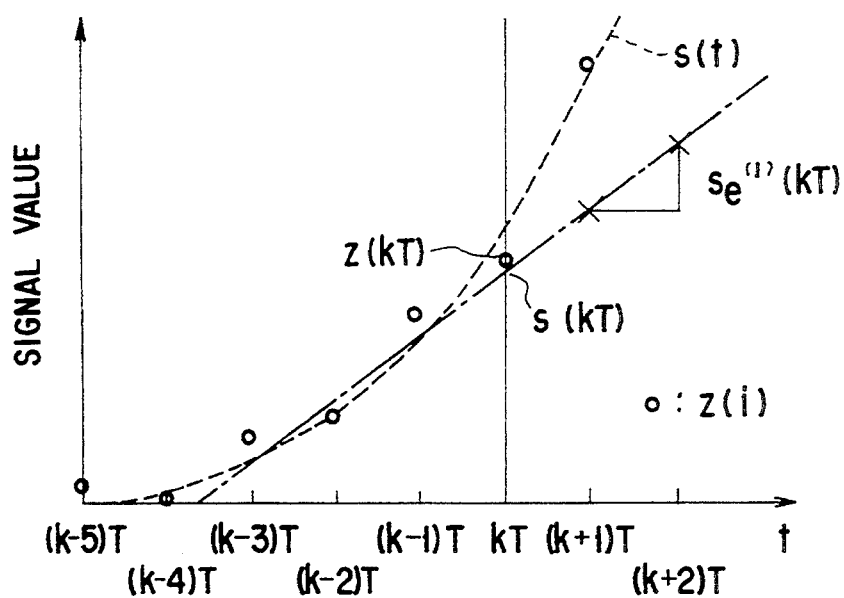
F I G. 30

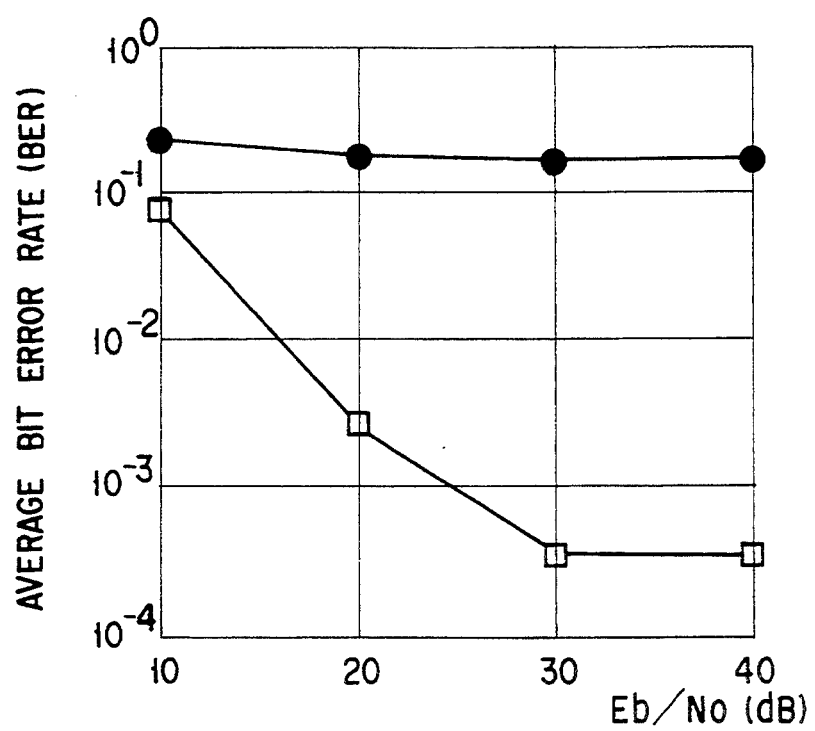
F I G. 31

METHOD AND APPARATUS FOR EQUALIZING TRANSMISSION LINE CHARACTERISTICS WHICH VARY AT HIGH SPEED IN MOBILE RADIO COMMUNICATION

BACKGROUND OF THE INVENTION

1. Field of the Invention

The present invention relates to a method and apparatus for equalization by compensating for a wave distortion caused by intersymbol interference in digital communication such as mobile radio communication.

2. Description of the Related Art

A maximum likelihood sequence estimation (MLSE) is known as one of adaptive equalizers. In this equalizer, likelihood functions corresponding to all possible signal sequences are calculated, and a signal sequence maximizing the likelihood function is selected in signal decision. However, with an increase in length of a signal sequence, the number of all possible signal sequences is exponentially increased. A Viterbi equalizer which estimates states by using a Viterbi algorithm is known as an equalizer capable of reducing the amount of arithmetic processing by decreasing the number of signal sequences G. D. Forhey, "Maximumlikelihool sequence estimation of digital sequences in the presence of intersymbol interference," IEEE Trans. Inform. Theory, Vol. IT-18, pp. 363–378, May 1972.

FIG. 1 is a block diagram showing the arrangement of a conventional Viterbi equalizer. (A. Baier, G. Heinrich, and U. Wellens, "Bit Synchronization and Timing Sensitivity in Adaptive Viterbi Equalizers for Narrowband-TDMA Digital Mobile Radio Systems", Proc. IEEE Vehicular Technology Conference '88, pp. 377–384, June 1988).

Referring to FIG. 1, a quasi-coherent demodulated signal is input to a sampling circuit 111 through an input terminal 10. The sampling circuit 111 outputs a sampled signal to a correlator 11 and a subtracting circuit 12. A sampled signal y(i) is a sampled value of the quasi-coherent demodulated signal when a received signal r(t) is represented by $$r(t) = Re[y(t) \cdot exp(j2\pi ft)] \quad (1)$$

where f is the carrier frequency, and Re [x] is the real part of x. In this case, assume that the sampled signal y(i) includes a modulation wave having a symbol rate 1/T, and the sampling frequency is represented by T.

The correlator 11, which receives the sampled signal y(i), estimates the impulse response of radio transmission on the basis of a known signal included in a transmitted signal. For example, the impulse response of radio transmission can be estimated by calculating correlation of the sampled signal with a training signal added to the start portion of a burst (as shown in FIG. 2). The correlator 11 sets this estimated impulse response value as the tap coefficient of a transversal filter 13. Note that the tap coefficient is not updated in a data signal interval of the burst.

The subtracting circuit 12 subtracts a transversal filter output from the sampled signal y(i) and outputs the resultant value as an estimation error. A squaring circuit 110 multiplies the square of the estimation error by −1 and outputs the resultant value, as a branch metric, to a Viterbi algorithm circuit 15 through a switch circuit 14. In the Viterbi algorithm circuit 15, a finite number of state transitions occur every period T.

In this case, four types of state transitions are exemplified. Code sequences corresponding to the respective state transitions are input to a signal generating circuit 16. The signal generating circuit 16 generates complex symbol signal sequences corresponding to the respective input code sequences. The switch circuit 17 sequentially selects the signal sequences and outputs them to the transversal filter 13. The transversal filter 13 has a tap coefficient common to all the state transitions. The transversal filter 13 converts the signal sequences, which differ from each other in the respective state transitions, into estimated signals, and outputs them. Note that if a complex symbol signal sequence coinciding with a transmitted one is input to the transversal filter 13, an estimated signal nearly equal to the received signal is output. The switch control circuit 18 controls a switch circuit 14 and the switch circuit 17 at the same timing.

The output of the squaring circuit 110 is identified as a branch metric of a state transition selected by the switch circuit 14, and is input to the Viterbi algorithm circuit 15. The Viterbi algorithm circuit 15 performs signal decision, and outputs the resultant decision signal from an output terminal 19.

A Viterbi algorithm for state estimation will be described below with reference to BPSK (binary phase shift keying) modulation. The sampled signal y(i) in a multipath propagation can be represented as follows:

$$y(i) = \sum_{m=0}^{K-1} h(m)a(i - m) + n(i) \quad (2)$$

where K is a positive integer, h(i) is the impulse response, a(k) is the complex symbol of a BPSK signal, which assumes "+1" or "−1" according to the transmitted data, and n(i) is white Gaussian noise. In equation (2), h(i) represents the impulse response of a two-path model. If the time spread of this impulse response is represented by 1T, then $$h(m) = \begin{cases} h_0 \ (m = 0) \\ h_1 \ (m = 1) \\ 0 \ (m \neq 0, 1) \end{cases} \quad (3)$$

Since intersymbol interference is caused, the sampled signal y(i) is obtained by weighting a(i) and a(i−1) by h(0) and h(1), respectively, and combining the weighted values and n(i). In this case, the radio transmission is described in two states. Note that the radio transmission is represented by using two states when the time spread of the impulse response is given by 1T. In general, when the spread is represented by (K−1)T, the constraint length is given by K, the radio transmission is described in $2^{K-1}$ states. Assume that sth state at a time point i−1 is represented by $\sigma^s_{i-1}$. In this case, since $0 \leq s \leq 1$, states $\sigma^0_{i-1}$ and $\sigma^1_{i-1}$ appear. When the time point advances from (i−1) to i, state transition occurs. Since a transition is dependent on the value of a complex symbol candidate $\alpha(i) = \pm 1$, two types of state transition occur from one state. Since the transition is destined for $\sigma^0_i$ or $\sigma^1_i$, the trellis diagram shown in FIG. 3 is obtained. As shown in this diagram, one state branches into two states, and two states merges into one state. That is, $\sigma^0_i$ is the transition destination when $\alpha(i) = -1$, and $\sigma^1_i$ is the transition destination when $\alpha(i) = 1$. In order to select one of two transitions merging at a transition destination, a transition metric $J_i(\sigma^s{}_i, \sigma^{s'}{}_{i-1})$ corresponding to a transition from $\sigma^s{}_i$ to $\sigma^{2'}{}_{i-1}$ is used.

A transition metric for the transition from the state $\sigma^1{}_i$ to the state $\sigma^{s'}{}_{i-1}$ is calculated by using a branch metric $BR(\sigma^s{}_i, \sigma^{2'}{}_{i-1})$ for each transition according to the following equation:

$$J_i(\sigma^s{}_i, \sigma^{s'}{}_{i-1}) = J_{i-1}(\sigma^{s'}{}_{i-1}) + BR(\sigma^s{}_i, \sigma^{s'}{}_{i-1}) \qquad (4)$$

For $$BR(\sigma^s{}_i, \sigma^{s\alpha}{}_{i-1}) = -|y(i) - \{h_0\alpha(i) + h_1\alpha(i-1)\}|^2 \qquad (5)$$

where $J_{i-1}(\sigma^{s'}{}_{i-1})$ is the path metric of $\sigma^{s'}{}_{i-1}$ at the time point $(i-1)$, which corresponds to a likelihood function. A transition signal sequence at the state transition from $\sigma^s{}_i$ to $\sigma^{s'}{}_{i-1}$ $\{\alpha(i-1), \alpha(i)\}$, its elements $\alpha(i-1)$ and $\alpha(i)$ are a complex symbol candidate of $a(j-1)$ corresponding to the state at the time point $(i-1)$ and a complex symbol candidate of $a(i)$ corresponding to the transition, respectively. In the Viterbi algorithm, the transition metrics $J_i(\sigma^s{}_i, \sigma^{s'}{}_{i-1})$ corresponding to two transitions which merge together are compared with each other, and a transition with a larger transition metric is selected, and the transition metric of the selected transition is set as a path metric $J_i(\sigma^s{}_i)$ at the time point $i$. Because only states sequences (paths) linked with selected transitions are left as maximum likelihood sequence candidates, the same number of paths as one of states survive. These paths are called survivor paths. If all the survivor paths merge together at a given past time point, since the state at the time point can be determined, signal decision is performed. If, however, they do not merge, signal decision is postponed. Subsequently, this operation is repeated. Note that if the sequences of states are only stored up to a past time point $(D-K+1)T$ because of limitations imposed on a memory, and survivor paths at the past time point $(D-K+1)T$ do not merge, signal decision is performed on the basis of the maximum likelihood path at the current time point, i.e., a path with the maximum path metric. The signal decided at this time is delayed from the current time point by a value DT. This value DT is called a decision delay (G. Ungerboeck, "Adaptive maximum-likelihood receiver for carrier-modulated data-transmission systems", IEEE Trans. Commun, vol. COM-22, pp. 624-636, May 1974). Note that $D \geq K$.

In this conventional arrangement, since the tap coefficient of the transversal filter 13, i.e., the filter performances, is not updated in a data signal interval of a burst, the performance of the equalizer is degraded in a radio transmission in which the impulse response of the radio transmission varies very fast as in mobile radio communication.

In order to suppress this degradation, attempts have been made to improve the tracking performance with respect to variations in the impulse response of transmission by estimating impulse response of the radio transmission even in a data signal interval of the burst (J. G. Proakis, Digital Communication, McGraw-Hill, 1983). The arrangement for such a technique is shown in FIG. 4.

A quasi-coherent demodulated signal is input to a sampling circuit through an input terminal 40. The sampling circuit 41 outputs a sampled signal $y(i)$. Note that $y(i)$ includes a modulation wave having a symbol period T, and that the sampling period is represented by T.

In a Viterbi algorithm circuit 45, a finite number of state transitions occurs every period T. FIG. 4 shows four types of state transitions. Code sequences corresponding to the respective state transitions are input to a signal generating circuit 47. The signal generating circuit 47 generates complex symbol signal sequences corresponding to the input code sequences. The generated complex symbol signal sequences are sequentially selected by a switch circuit 48 to be input to a transversal filter 410. The input signal sequences, which differ from each other in the respective state transitions, are converted into estimated signals and output by the transversal filter 410, which has a tap coefficient common to all the state transitions. Note that if a complex signal sequence coinciding with a transmitted one is input to the transversal filter 410, an estimated signal nearly equal to the sampled signal is output. The estimated signal is input to a subtracting circuit 42 so that an estimation error is obtained as the difference between the estimated signal and the sampled signal $y(i)$. A squaring circuit 43 calculates the square of the estimation error, multiplies the square by $-1$, and outputs the resultant value. This value is identified as a branch metric of the state transition selected by a switch circuit 44 and is input to the Viterbi algorithm circuit 45. The Viterbi algorithm circuit 45 performs signal decision and outputs the decision from an output terminal 46. A control circuit 412 estimates and sets the tap coefficient of the transversal filter 410 on the basis of an output from the signal generating circuit 47, which corresponds to the decision, and an output from a delay circuit 411, which receives the sampled signal. In this case, the control circuit 412 corresponds to a control means for setting a priori estimated coefficient vector as the tap coefficient of the transversal filter 410. The delay circuit 411 delays an input signal by a decision delay DT of the Viterbi algorithm circuit 45. Note that D is a positive integer. The switch control circuit 49 controls the switch circuit 44 and a switch circuit 48 at the same timing.

An operation of the control circuit 412 to which a conventional RLS algorithm (to be described later) is applied will be described next. FIG. 5 shows the arrangement of the control circuit 412. A sampled signal delayed by the delay time DT is input through an input terminal 50. A subtracting circuit 51 subtracts a priori estimated signal from the sampled signal and outputs the resultant value as a priori estimation error $\alpha_d(i)$. A multiplying circuit 52 multiplies the error $\alpha_d(i)$ by a gain vector $d(i)$ and outputs the product as a correction vector. An adding circuit 53 adds the priori estimated coefficient vector and the correction vector together to update a posteriori estimated coefficient vector. A delay circuit 54 delays the posteriori estimated coefficient vector by a time 1T, and outputs it, as the priori estimated coefficient vector, from an output terminal 56, thus setting it as the tap coefficient of the transversal filter 410. Note that this tap coefficient is equivalent to the impulse response of the radio transmission. An inner product operation circuit 55 calculates the inner product of the complex symbol sequence of a decision input from an input terminal 57 and a priori estimated coefficient vector, and outputs the inner product as the priori estimated signal. Note that a gain generating circuit 58 generates Kalman gain vector $d(i)$ from the complex symbol sequence of the decision. The gain generating circuit 58 consists of an inverse matrix operation circuit 59 and a matrix operation circuit 60. The inverse matrix operation circuit 59 generates an inverse matrix $\Phi(i)$ (to be described later). The matrix operation circuit 60 multiplies the inverse matrix $\Phi(i)$ by a vector $d(i)$ having the decision as an element (to be described later).

The RLS algorithm will be described below.

The complex symbol sequence of the decision from the input terminal 57 is represented by a K-dimensional vector $d(i)$ as follows:

$$^H d(i) = [a_d(i-D) a_d(i-D-1) \ldots a_d(i-D-K+1)] \quad (6)$$

where $a_d(i)$ is the decision of $a(i)$ and the superscript H denotes Hermitian transposition. A posteriori estimated coefficient vector $d(i)$ at the time point i is represented by a K-dimensional vector as follows:

$$^H d(i) = [W^*_d(i) W^*_d(i-1) \ldots W^*_d(i-K+1)] \ldots (7)$$

where * denotes complex conjugation and w(i) is the value of the tap coefficient of the transversal filter 410, i.e., the impulse response of the radio transmission. Note that a priori estimated coefficient vector at the time point i is $d(i-1)$.

In the least squares method, the vector $d(i)$ is estimated to minimize the weighted square of a posteriori estimation error $e_m(i)$ represented by the following equation:

$$e_d(i) = y(i-D) - {}^H d(i) \, d(i) \quad (8)$$

The RLS algorithm is an algorithm for recursively performing this estimation. The following is an algorithm for updating the vector $d(i)$ (Simon Haykin, "Adaptive Filtering Theory", Prentice-Hall, 1986):

$$d(i) = \frac{\lambda^{-1} \, d(i-1) \, d(1)}{1 + \lambda^{-1} \, d^H(i) \, d(i-1) \, d(i)} \quad (9\text{-a})$$

$$a_d(i) = y(i) - d^H(i) \, d(i-1) \quad (9\text{-b})$$

$$X_d(i) = d(i-1) + d(i) a_d(i) \quad (9\text{-c})$$

$$d(i) = \lambda^{-1} \, d(i-1) - \lambda^{-1} \, d(i) \, d^H(i) \, d(i-1) \quad (9\text{-d})$$

where $d(i)$ is the inverse matrix of the autocorrelation matrix of $d(i)$, and k is the forgetting factor positive constant of not more than 1). Note that Kalman gain vector $d(i)$ is equal to $d(i) \, d(i)$.

In this arrangement, since the impulse response estimation is performed on the basis of a sampled signal delayed by the time DT, the impulse response of the ratio transmission at the time DT past the current time point is estimated. For this reason, the conventional apparatus cannot follow fast ratio transmission variations, in which this delay cannot be neglected, thus causing a degradation in equalization performance.

Furthermore, in the conventional arrangement, when the received signal power level is greatly decreased in a fading environment, a degradation in equalization performances cannot be avoided.

For example, in a TDMA (time division multiple access), a burst having the arrangement shown in FIG. 2 signal for initializing an equalizer, and a subsequent data signal. If the radio transmission is represented by a two-path model with the delay time T, as shown in FIG. 6, two bursts of advanced and delayed paths are weighted by equation (3) and the weighted valves are combined. As a result, the received signal are received with noise added in practice. Therefore, an advanced path at each time point is subjected to intersymbol interference caused by a past symbol delayed by the time T.

A non-minimum phase system in which the level of an advanced path is lower than that of a delayed path will be considered as a case wherein a Viterbi equalizer is not properly operated. FIG. 7 shows a trellis diagram at a last time point N when the burst length is represented by N, provided that $$|h_0| < |h_1| \quad (10)$$

and $$y(i) = h_0 a(i) + h_1 a(i-1) + n(i) \quad (11)$$

If the impulse response of the radio transmission is accurately estimated, a branch metric $BR(\sigma^s{}_N, \sigma^t{}_{N-1})$ is $$\begin{aligned}
BR(\sigma_N{}^s, \sigma^t{}_{N-1}) &= -|y(N) - h_0 \alpha(N) - h_1 a(N-1)|^2 \\
&= -|h_0\{a(N) - \alpha(N)\} + h_1\{a(N-1) - \alpha(N-1)\} + n(N)|^2
\end{aligned} \quad (12)$$

In the non-minimum phase, when the level of received signal power is low, the noise level often exceeds $|h_0|^2$. The difference between the symbol and the symbol candidates, represented by $a(N) - \alpha(N)$, dose not remarkably appear in the branch metrics of two state transitions branching from the same state. That is, in FIG. 7, the branch metrics of state transitions B1 and B2 from a state $\sigma^0{}_{N-1}$ to states $\sigma^0{}_N$ and $\sigma^1{}_N$ almost coincide with each other. Similarly, the branch metrics of state transitions B3 and B4 from a state $\sigma^1{}_{N-1}$ to the states $\sigma^0{}_N$ and $\sigma^1{}_N$ almost coincide with each other. Therefore, the state transitions B1 and B2 or B3 and B4 are selected. In either case, however, since selected state transition occurs from the same state, there is almost no difference between the branch metrics of the state transitions B1 and B2 or B3 and B4. Consequently, there is no conspicuous difference between path metrics corresponding to the two selected state transitions.

In the conventional equalizer, metric calculation is completed at this time, and a path having the maximum metric is selected to generate a decision signal. Therefore, a decision error is caused at a high probability with respect to the last symbol of a burst. Although the conventional apparatus employs a method of inserting a known signal as the last symbol of a burst in order to eliminate this drawback, a decrease in burst transmission efficiency cannot be avoided because of transmission of known signals.

The relationship between a sampling clock and equalization performance will be described next. FIG. 8 shows the waveform of a received signal having neither waveform distortion nor noise. When the timing offset of the sampling clock is 0, sampling is performed at each time point indicated by "sampling 1". In order to properly operate an equalizer, the received signal waveform must be accurately reproduced from a sampled signal sequence. However, if sampling is performed every symbol interval T, inaccurate waveform reproduction results from a timing offset as will be described below. The received signal waveform shown in FIG. 8 has undergone Nyquist roll-off filtering and contains components having Nyquist frequencies $\tfrac{1}{2}T$ to $1/T$ in a frequency region since the roll-off ratio normally ranges from 0 to 1. Therefore, folded distortion occurs at a Nyquist frequency ½T in sampling at every interval T. This distortion varies depending on a sampling timing. This state can be shown by reproducing waveforms based on a sampling function with the sampling period T. FIGS. 9 and 10 respectively show the waveforms at "sampling 1" and "sampling 2". At "sampling 1", the original waveform can be reproduced. However, at "sampling 2", when there is a timing offset T/2, the original waveform cannot be accurately reproduced. In addition, with the timing offset T/2, the average received signal power is reduced.

As described above, in the conventional Viterbi equalizer, since the sampling period coincides with the symbol period, the equalization performance is greatly degraded by the timing offset of the sampling clock.

In the conventional arrangement described above, since the impulse response estimation is performed on the basis of a delayed sampled signal, the past impulse response is estimated. For this reason, the conventional apparatus cannot track fast variations of the impulse response, in which this delay cannot be neglected, thus causing a degradation in equalization performance.

In addition, when the received signal power level is greatly decreased in a fading environment, a degradation in equalization performance cannot be avoided.

Furthermore, a decision error is caused at a high probability with respect to the last symbol of a burst. 10 Although the conventional apparatus employs the method of inserting a known signal as the last symbol of a burst in order to eliminate this drawback, a decrease in burst transmission efficiency cannot be avoided because of transmission of known signals.

Moreover, since the sampling period coincides with the symbol period, the equalization performance is greatly degraded by the timing offset of the sampling clock.

SUMMARY OF THE INVENTION

It is an object of the present invention to provide a method and apparatus for equalization in an impulse response of mobile transmission which varies fast in mobile radio communication, which can eliminate the above-described conventional drawbacks and ensure excellent equalization performances even if the impulse response varies fast.

In order to achieve the above object, according to the present invention, there is provided a method of equalization in the impulse response of mobile transmission which varies fast in mobile radio communication, comprising the steps of:

receiving a quasi-coherent demodulated signal, and outputting a sampled signal obtained at a sampling period;

receiving a code sequence undergoing transition at a predetermined period and corresponding to each state transition and a code sequence corresponding to a path of each state transition, and generating and outputting a signal sequence corresponding to each state transition and a signal sequence corresponding to the path of each state transition;

receiving the signal sequence corresponding to each state transition, and outputting an estimated signal for each state transition by using an adaptive filter constituted by a transversal filter having a priori estimated coefficient vector as a tap coefficient;

receiving a branch metric for each state transition, obtained by using a square of an estimation error obtained by subtracting the estimated signal for each state transition from the sampled signal, outputting a decision, the code sequence corresponding to each state transition, and the code sequence corresponding to the path of each state transition by using a Viterbi algorithm, and estimating states; and performing control to update the priori estimated coefficient vector by adding a calculation value, as a correction term, to the prior estimated coefficient vector, the step of performing control including the step of obtaining the correction term as a calculation value which is constituted by the step of obtaining an operation value by performing an inner product operation between the signal sequence corresponding to the path of each state transition and the priori estimated coefficient vector as a basic value for the estimated signal, and calculating a priori estimation error by subtracting the operation value from the sampled signal which has undergone a predetermined delay operation, and the step of calculating a Kalman gain vector by performing an inverse matrix operation on the basis of the signal sequence corresponding to the path of each state transition, and multiplying the priori estimation error by the Kalman gain vector.

In addition, according to the present invention, there is provided an apparatus for equalization in the impulse response of mobile transmission which varies fast in mobile radio communication, comprising:

receiving means constituted by a sampling circuit for receiving a quasi-coherent demodulated signal, and outputting a sampled signal obtained at a sampling period;

signal generating means for receiving a code sequence undergoing transition at a predetermined period and corresponding to each state transition and a code sequence corresponding to a path of each state transition, and outputting a signal sequence corresponding to each state transition and a signal sequence corresponding to the path of each state transition;

adaptive filter means constituted by a transversal filter having a tap coefficient and connected to the signal generating means, for receiving the signal sequence corresponding to each state transition, and outputting an estimated signal for each state transition;

state estimating means for receiving a branch metric for each state transition, obtained by a branch metric operation circuit using a square of an estimation error obtained by subtracting the estimated signal for each state transition from the sampled signal, outputting a decision, the code sequence corresponding to each state transition, and the code sequence corresponding to the path of each state transition by using a Viterbi algorithm; and control means for performing an RLS algorithm for obtaining a prior estimation error by subtracting an inner product operation value, obtained by performing an inner product operation between the signal sequence corresponding to the path of each state transition and the tap coefficient, from the sampled signal which has undergone a predetermined delay operation, and for updating the tap coefficient by adding a product, obtained by multiplying of the priori estimation error by a Kalman gain vector, obtained by performing a matrix operation of the signal sequence corresponding to the path of each state transition, as a correction term to the tap coefficient.

With the above-described arrangement, according to the present invention, in the method and apparatus for equalization in the impulse response of mobile radio which varies fast in mobile radio communication, a transversal filter is arranged for each state transition, and coefficient control is performed by using the RLS algorithm to minimize the estimation error for each state transition, so that excellent equalization performances can be obtained even if the impulse response of mobile radio varies fast.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a trellis diagram showing a two-path model in the BPSK scheme;

FIG. 5 is a block diagram showing an arrangement of a conventional control circuit in FIG. 4;

FIG. 6 is a view showing a radio transmission represented by a two-path model with a delay time T;

FIG. 7 is a trellis diagram showing a two-path model of the BPSK scheme at the last symbol of a burst;

FIG. 11 is a block diagram showing the overall arrangement of an apparatus of the present invention;

FIG. 12 is a block diagram showing the detailed arrangement of an estimation error operation circuit in FIG. 11;

FIG. 13 is a trellis diagram showing a two-path model of the PBSK scheme in code sequences corresponding to the paths of state transitions;

FIG. 14 is a graph showing the comparison between the average bit error rate performance of a conventional apparatus and that of the apparatus of an embodiment of the present invention so as to explain the effect of the present invention;

FIG. 17 is a trellis diagram for explaining an operation of the apparatus of the embodiment shown in FIG. 11;

FIG. 18 is a trellis diagram for explaining another operation of the apparatus of the embodiment shown in FIG. 11;

FIG. 19 is a graph showing average bit error performances obtained when a limitation is imposed on a signal generating means in the apparatus of the embodiment shown in FIG. 11;

FIG. 20 is a block diagram showing still another arrangement of the estimation error operation circuit in the apparatus of the embodiment in FIG. 11;

FIG. 21 is a block diagram showing an arrangement of a fractional tap-spacing transversal filter in FIG. 20;

FIG. 22 is a graph showing sampling of a received signal at a period T/2 to explain the relationship between fractional tap-spacing sampling and equalization performances;

FIG. 23 is a graph showing a received signal waveform reproduced at "sampling 1" in FIG. 22;

FIG. 24 is a graph showing a received signal waveform reproduced at "sampling 2" in FIG. 22;

FIG. 28 is a block diagram showing another arrangement of the control circuit 12-4 in FIG. 12;

FIG. 29 is a graph for explaining an algorithm used for a control circuit 28-0 in FIG. 28;

FIG. 30 is another graph for explaining the algorithm used for the control circuit 28-0 in FIG. 28; and FIG. 31 is a graph showing the average bit error performance of the apparatus shown in FIG. 11 which has the estimation error operation circuit 11-2 using the control circuit 28-0 shown in FIG. 28.

DETAILED DESCRIPTION OF THE PREFERRED EMBODIMENTS

Figure 1:
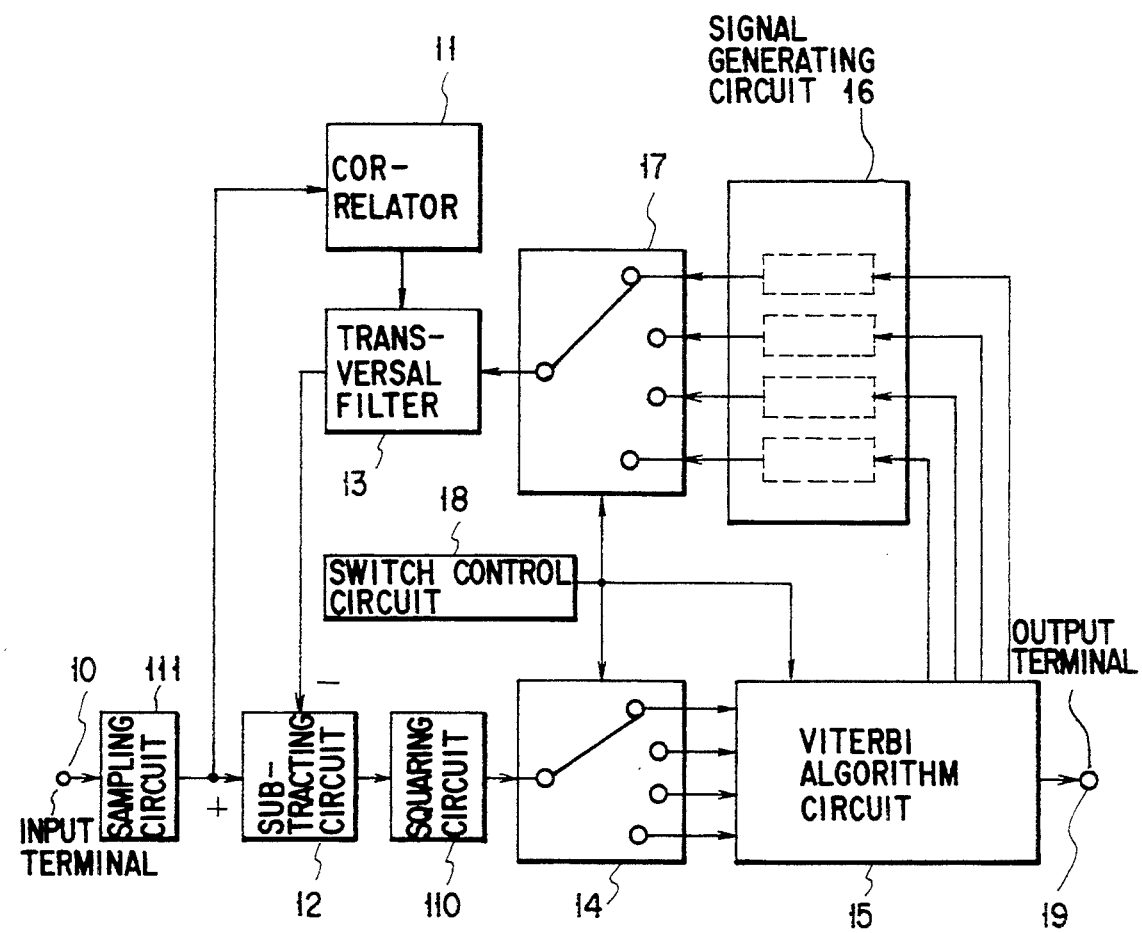
FIG. 1 is a block diagram showing an arrangement of a conventional Viterbi algorithm equalizer.
Figure 2:
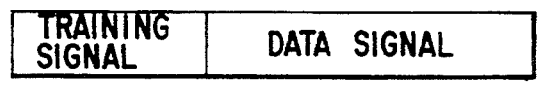
FIG. 2 is a view showing a format of a burst.
Figure 4:
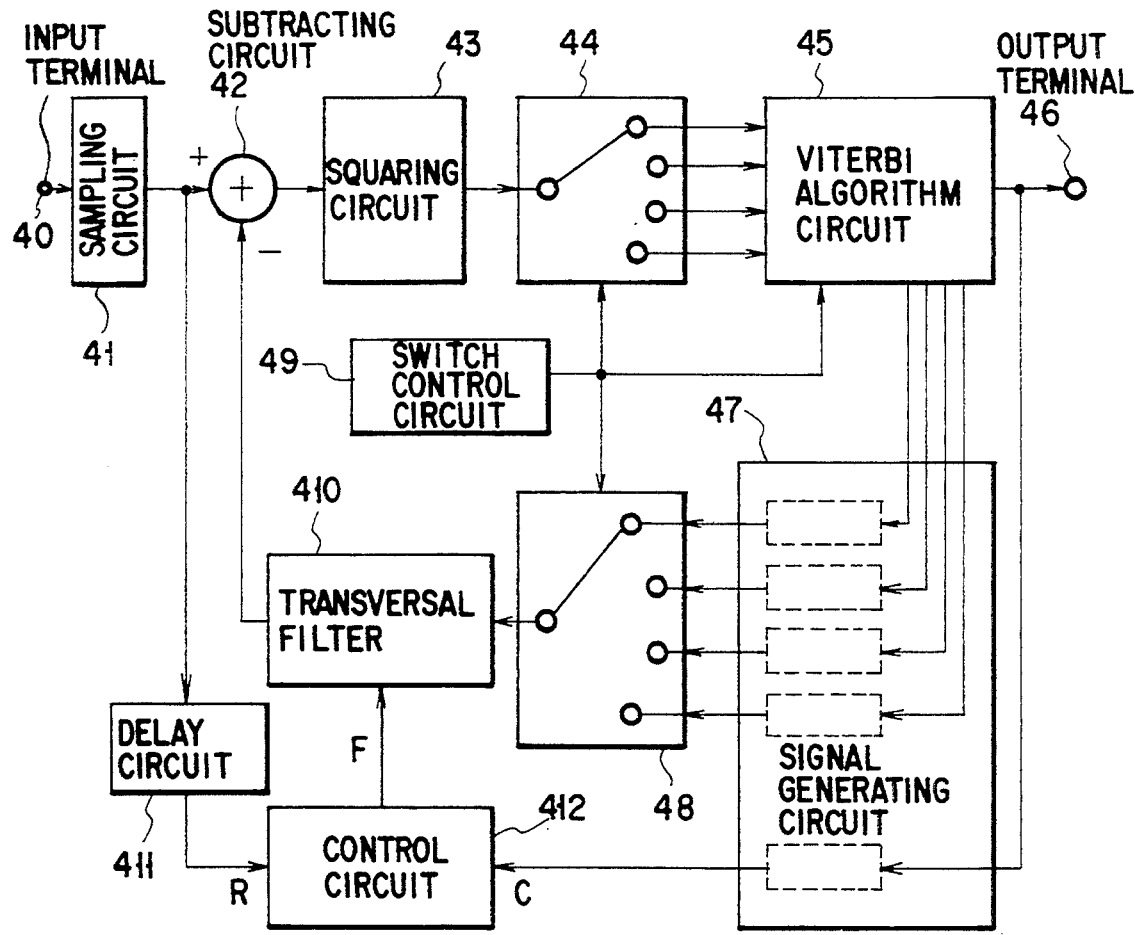
FIG. 4 is a block diagram showing another arrangement of the conventional Viterbi algorithm equalizer.
Figure 8:
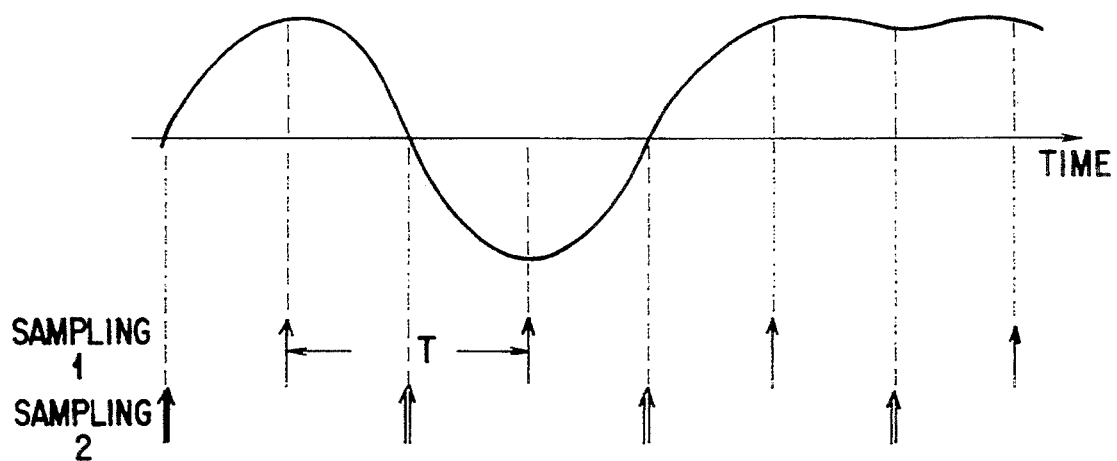
FIG. 8 is a graph showing a state wherein a received signal is sampled at a symbol period.
Figure 9:
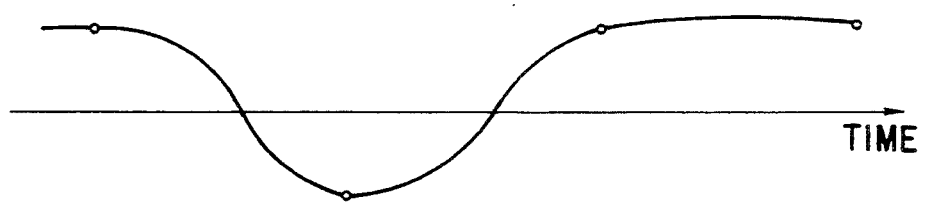
FIG. 9 is a graph showing a received signal waveform reproduced at "sampling 1" in FIG. 8.
Figure 10:
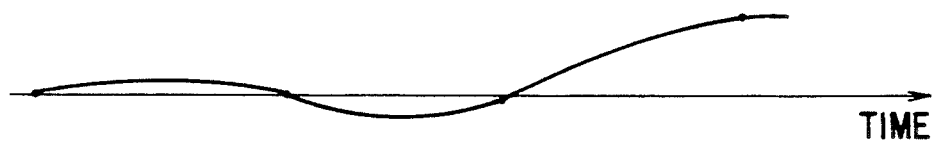
FIG. 10 is a graph showing a received signal waveform reproduced at "sampling 2" in FIG. 8.

An embodiment of the present invention will be described below with reference to the accompanying drawings.

FIG. 11 shows the overall arrangement of an embodiment. FIG. 12 shows the arrangement of an estimation error operation circuit according to an embodiment.

Referring to FIG. 11, a quasi-coherent demodulated signal is input to a sampling circuit 11-1 through an input terminal 11-0. The sampling circuit 11-1 outputs a sampled signal I. Note that the sampling period is represented by T. The sampled signal I is input to estimation error operation circuits 11-2$_1$ to 11-2$_4$ for calculating estimation errors corresponding to the respective state transitions. The number of these estimation error operation circuits is equal to the number of state transitions. In this case, four types of state transitions are exemplified. Each of the estimation error operation circuits 11-2$_1$ to 11-2$_4$ receives a code sequence S corresponding to one of the state transitions and a code sequence P corresponding the path of one of the state transitions, which are output from a Viterbi algorithm circuit 11-3, and outputs a value O, obtained by multiplying the square of the obtained estimation error by $-1$, as a branch metric corresponding to one of the state transitions, to the Viterbi algorithm circuit 11-3. The Viterbi algorithm circuit 11-3 performs signal decision and outputs the decision from an output terminal 11-4.

Referring to FIG. 12, a subtracting circuit 12-0 subtracts an estimated signal, output from a transversal filter 12-1, from the sampled signal I, and outputs the resultant value as an estimation error. A squaring circuit 12-2 supplies the value O, obtained by multiplying the square of the estimation error by $-1$, to the Viterbi algorithm circuit 11-3. A signal generating circuit 12-3 receives the code sequence S corresponding to a state transition from the Viterbi algorithm circuit 11-3 and generates a symbol sequence. The transversal filter 12-1 is a filter for converting the symbol sequence corresponding to the state transition into an estimated signal by performing convolution operations. This estimated signal is supplied to the subtracting circuit 12-0. A signal generating circuit 12-5 receives the code sequence P corresponding to the path of the state transition from the Viterbi algorithm circuit 11-3 and generates a symbol sequence. A delay circuit 12-6 delays the sampled signal I by a predetermined amount, and outputs the delayed signal. However, in a training signal interval, the delay circuit 12-6 outputs the value I without delaying it. A control circuit 12-4 performs initial estimation of the tap coefficient of the transversal filter 12-1 by using the training signal and the output from the delay circuit 12-6. Similarly, in a data signal interval, the control circuit 12-4 updates the tap coefficient of the transversal filter 12-1 on the basis of the symbol sequence corresponding to the path of the state transition and the output from the delay circuit 12-6 in a real-time manner. In this case, the RLS algorithm is applied to the control circuit 12-4. This circuit employs the conventional circuit arrangement shown in FIG. 5.

The Viterbi algorithm circuit 11-3 constitutes a state estimating means. An adaptive filter corresponds to the transversal filter 12-1, and a control means corresponds to the control circuit 12-4. A receiving means corresponds to the sampling circuit 11-1; a signal generating means, the signal generating circuit 12-3 and 12-5; and a branch metric calculating means, the subtracting circuit 12-0 and the squaring circuit 12-2. In addition, if arithmetic processing is to be time-divisionally performed with respect to each state transition, the estimation error operation circuits 11-2$_1$ to 11-2$_4$ can be integrated into one circuit.

Code sequences corresponding to the paths of state transitions will be described next with reference to FIG. 13. FIG. 13 shows the same case as that shown in FIG. 3, in which the BPSK scheme is set as a modulation scheme and the number of states is two. There are two ways of selecting a code sequence corresponding to the path of each state transition, i.e., (i) selecting a code sequence corresponding to each survivor path connected to a state from which branching occurs; and (ii) selecting a code sequence including a state transition and a survivor path. According to the way (i), when state transitions B1 and B2 branching from a state $\sigma_i^0$ are considered, code sequences corresponding to survivor paths connected to the state $\sigma_i^0$, i.e., a path 0, are selected as code sequences corresponding to the paths of the state transitions. Similarly, when state transitions B3 and B4 branching from a state $\sigma_i^1$ are considered, code sequences corresponding to survivor paths connected to the state $\sigma_i^1$, i.e., a path 1, are selected. In this case, the delay circuit 12-6 must delay the sampled signal I by a time 1T. In contrast to this, according to the way (ii), a code sequence corresponding to the path of the state transition B1 is a code sequence including the state transition B1 and the path 0. It is, therefore, apparent that the code sequences differ depending on state transitions. In this case, the delay circuit 12-6 must output the sampled signal I without delaying it.

As is apparent from the above description, when code sequences corresponding to survivor paths connected to a state from which branching occurs are selected as code sequences corresponding to the paths of state transitions, the impulse response estimation is only required to be performed by a number of times corresponding to the number of states, thus reducing the operation amounts.

FIG. 14 is a graph for explaining the effect of the present invention, which can be obtained by the apparatus of the embodiment shown in FIGS. 11 and 12. More specifically, FIG. 14 shows average bit error (BER) performances with respect to an average $E_b/N_o$, which were obtained by computer simulations. The simulation conditions were set as follows: a modulation scheme was the QPSK (quaternary phase shift keying) scheme; a transmission rate, 40 kb/s; a maximum Doppler frequency, 160 Hz; and a radio transmission, a two-path Rayleigh fading model with a two-path delay time difference 1T. Referring to FIG. 14, rectangles indicate the performance obtained by the arrangement of the present invention, whereas dots indicate the performance obtained by the conventional arrangement. In the present invention, since the impulse response of a radio transmission at the current time point is estimated, the method can respond well to variations in radio transmission. It is, therefore, apparent from the graph that the method of the present invention improves the equalization performances as compared with the conventional method.

Figure 15:
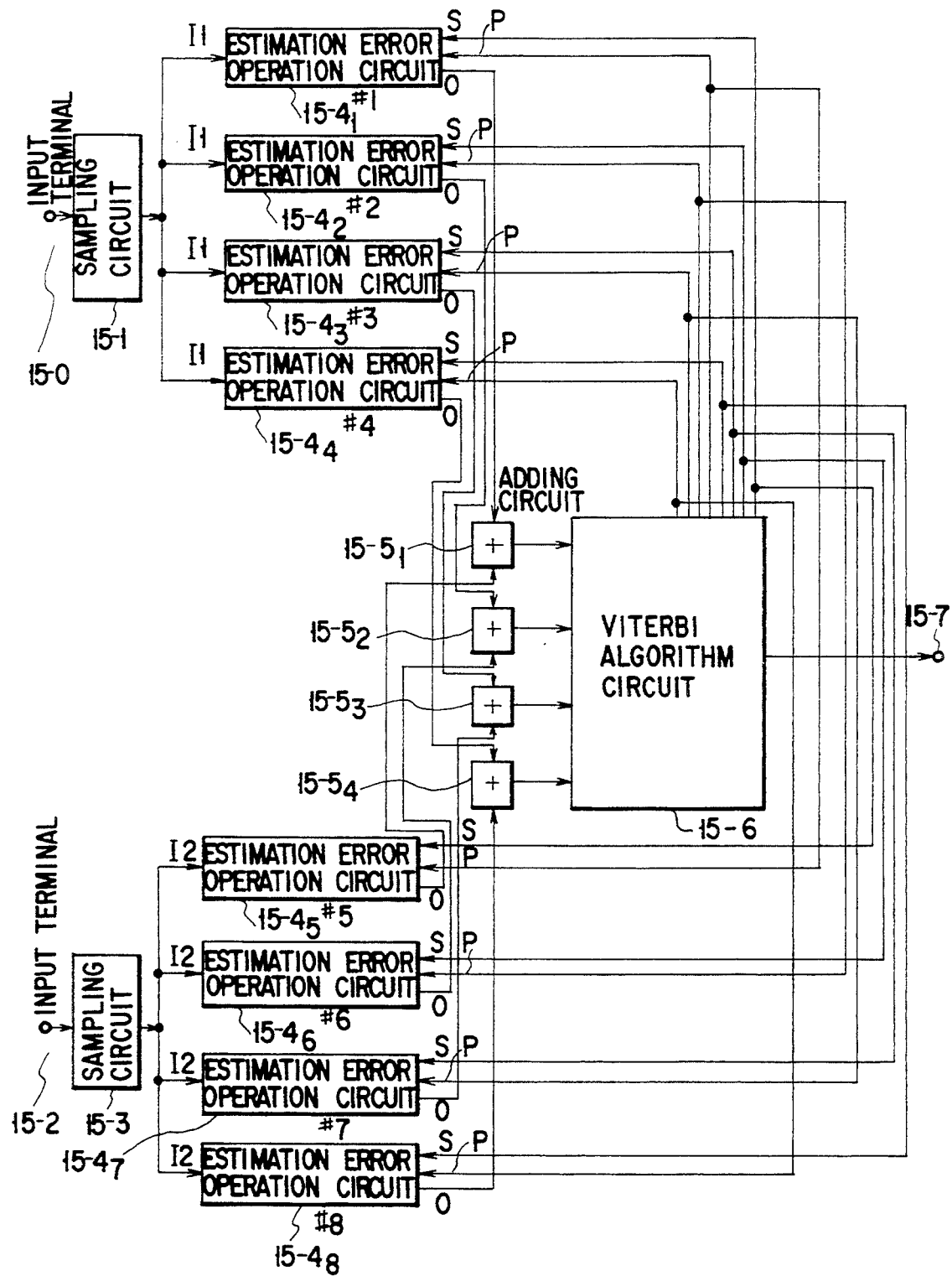
FIG. 15 is a block diagram showing another arrangement of the apparatus of the present invention.

FIG. 15 is a block diagram showing the arrangement of another embodiment of the present invention. In this embodiment, two branch diversity branches and four state transitions are exemplified. Referring to FIG. 15, quasi-coherent demodulated signals for the respective diversity branches are input through input terminals 15-0 and 15-2. Sampling circuits 15-1 and 15-3 respectively sample the quasi-coherent demodulated signals for the respective diversity branches at a sampling period T, and output sampled signal $I_1$ and $I_2$ for the respective diversity branches. The sampled signals $I_1$ and $I_2$ are respectively input to estimation error operation circuits 15-4$_1$ to 15-4$_4$ and 15-4$_5$ to 15-4$_8$ for calculating estimation errors corresponding to state transitions in units of diversity branches. In each diversity branch, the number of these estimation error operation circuits is equal to the number of state transitions. Each of the estimation error operation circuits 15-4$_1$ to 15-4$_8$ receives a code sequence S corresponding to one of the state transitions and a code sequence P corresponding to the path of one of the state transitions, output from a Viterbi algorithm circuit 15-6, and outputs a value O, obtained by multiplying the square of the obtained estimation error by $-1$, to a corresponding one of adding circuits 15-5$_1$ to 15-5$_4$. The adding circuits 15-5$_1$ to 15-5$_4$ supply values, obtained by summing up the values O in the respective diversity branches as branch metrics corresponding to the state transitions, to the Viterbi algorithm circuit 15-6. The Viterbi algorithm circuit 15-6 performs signal decision and outputs the resultant decision signal from an output terminal 15-7. Each of the estimation error operation circuits 15-4$_1$ to 15-4$_8$ has the same circuit arrangement as that shown in FIG. 12 described above.

Since the reception scheme is expanded to the diversity reception scheme in this manner, excellent equalization performance can be obtained even when the impulse response of radio transmission varies fast and the received signal power level is greatly decreased in a fading environment.

Figure 16:
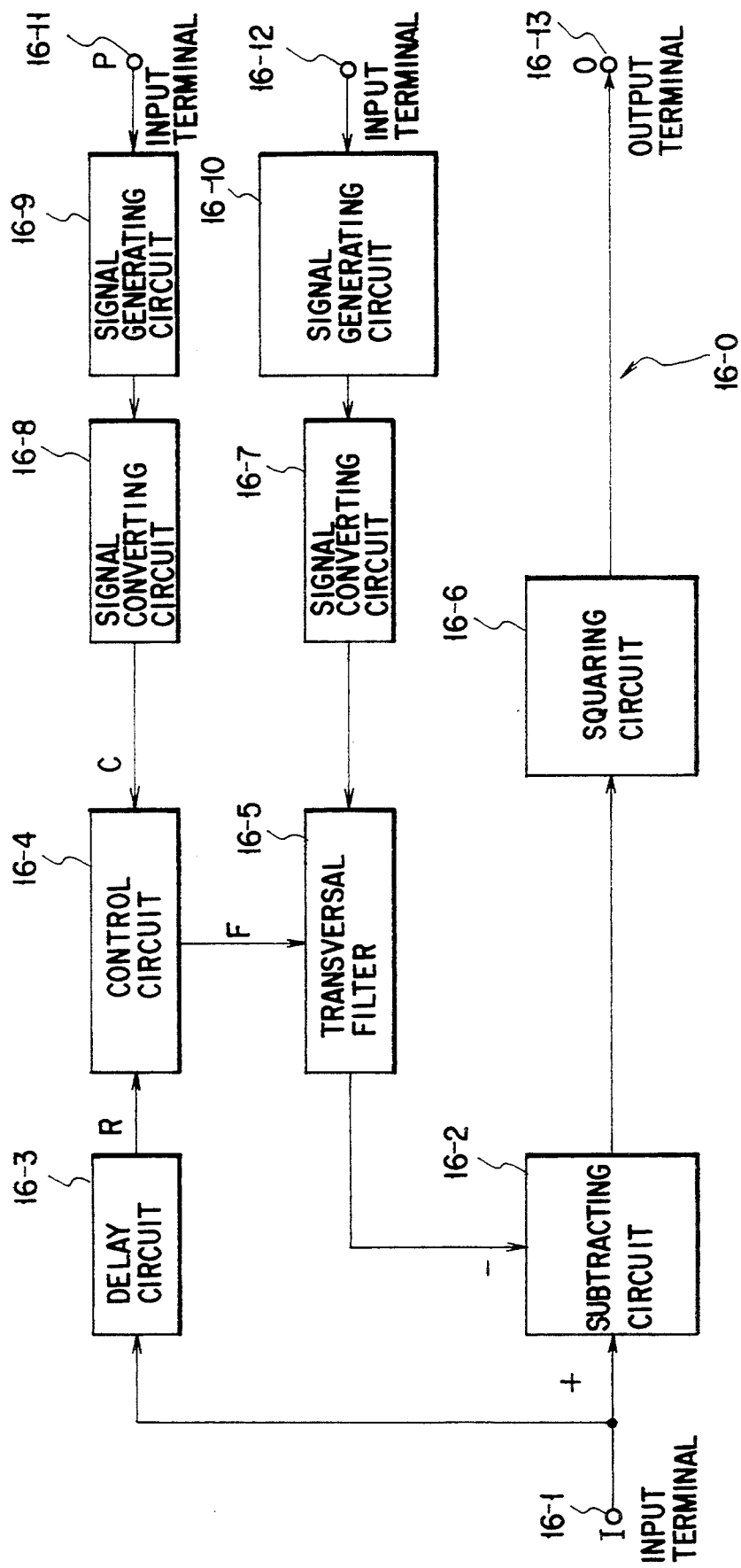
FIG. 16 is a block diagram showing another arrangement of the estimation error operation circuit in FIG. 11.

The arrangement of this embodiment is the same as that of the embodiment shown in FIG. 11 except that the arrangement of the estimation error operation circuit 11-2 is changed. FIG. 16 shows an arrangement of an estimation error operation circuit 16-0 used in place of the circuit 11-2.

The estimation error operation circuit 16-0 is different from the estimation error operation circuit 11-2 in that signal converting circuits 16-7 and 16-8 are respectively inserted between a signal generating circuit 16-10 and a transversal filter 16-5 and between a signal generating circuit 16-9 and a control circuit 16-4.

The signal converting circuits 16-7 and 16-8 will be described in detail below.

Assume that this embodiment is associated with a non-minimum phase and a constraint length K is 2, a radio transmission is represented by a two-path mode with a delay time T, and the power level of an advanced path is low. In this case, therefore, if metric calculation is completed at a last time point N of a burst, the probability of causing a decision error at the last symbol of a burst is increased. In order to prevent this, in this embodiment, signal decision is performed by prolonging equalization processing by the time T using symbol sequences output from the signal converting circuits 16-7 and 16-8. This signal decision is performed either in a first case, wherein no signal is present after a burst or in a second case, wherein the next burst follows immediately after a burst, and a known signal is set at the start position of the next burst. These cases are separately described below.

The case wherein no signal is present after a burst will be described first.

Since no transmission signal is transmitted at an extended time point N+1, if a branch metric is calculated by generating a signal sequence corresponding to a state transition on the basis of a state transition trellis as in the conventional equalizer, a correct value cannot be obtained.

In this embodiment, therefore, at the time point N+1, an estimated signal α(N+1)=0 is generated by the signal converting circuits 16-7 and 16-8. The corresponding symbol sequence is given by $\{a(N),0\}$, and a branch metric is calculated. In addition, assume that the Viterbi algorithm circuit 11-3 set a new state $\sigma^2_{N+1}$, and the respective states merge into the new state at the time point N+1. This operation is shown in FIG. 17.

Branch metrics $BR(\sigma^2_{N+1}, \sigma^s_N)$ corresponding to a state transition B5 from a state $\sigma^0_N$ to the state $\sigma^2_{N+1}$ and a state transition B6 from a state $\sigma^1_N$ to the state $\sigma^2_{N+1}$ are represented by $$BB(\sigma^2_{N+1}, \sigma_N^s) = -|y(N + 1) - h_1 a(N)|^2 \quad (13)$$
$$= -|h_1\{a(N) - \alpha(N)\} + n(N + 1)|^2$$

Since a difference a(N)−α(N) between an actual symbol a(N) at a time point N and a candidate symbol α(N) is clearer in these branch metrics than in $BR(\sigma^s_N, \sigma^t_{N-1})$ in formula (13), the resultant path metric reflects the difference between a(N) and α(N). If, therefore, signal decision is performed by selecting one of the state transitions B5 and B6 which has a larger transition metric $J_{N+1}(\alpha^2_{N+1}, \sigma^s_N)$, errors at the last symbols of bursts can be reduced.

The case wherein the next burst follows immediately after a burst, and a known signal is set at the start position of the next burst will be described next.

A known signal is used for α(N+1) on the assumption that the respective states merge into a state corresponding to the known signal. A branch metric corresponding to each state transition is calculated by using a sequence $\{\alpha(N),\alpha(N+1)\}$ generated by the signal converting circuits 16-7 and 16-8. This operation is shown in FIG. 18. Note that FIG. 18 shows a case wherein α(N+1)=−1. A state transition B7 is a transition from a state $\sigma^0_N$ to a state $\sigma^0_{N+1}$, whereas a state transition B8 is a transition from a state $\sigma^1_N$ to the state $\sigma^0_1$. If signal decision is performed by selecting one of the state transitions B7 and B8 which has a larger transition metric, errors at the last symbols of bursts can be reduced.

In this case, branch metrics extending from the last symbol of burst by an amount corresponding to one symbol are taken into consideration. If, however, the impulse response of the radio transmission has a time spread (K−1)T, state estimation must be performed by extending branch metrics by an amount corresponding to (K−1) symbols.

The above-described embodiments are associated with BPSK modulation. However, the present invention can be equally applied to PSK (phase-shift keying) modulation and QAM (quadrature amplitude modulation).

FIG. 19 is a graph for explaining the effect of the present invention. More specifically, FIG. 19 shows bit error rate performance with respect to a $E_b/N_o$, which were obtained by computer simulations. The simulation conditions were set as follows: a modulation scheme was the QPSK scheme; a transmission rate, 40 kb/s; the forgetting factor λ of the RLS algorithm applied for the impulse response estimation, 0.9; and a radio transmission model, a static two-path model in which the complex amplitudes of advanced and delayed paths were respectively set to be 0.5 and 1.0. In addition, assume that no signal is present after a burst. Referring to FIG. 19, rectangles indicate a case (prior art) wherein no known signal is inserted as the last symbol of each burst, and crosses indicate a case (prior art) wherein a known signal is inserted as the last symbol of each burst. In addition, circles indicate the performance of the embodiment of the present invention.

As shown in FIG. 19, with the arrangement of the embodiment, the equalization performance can be improved as compared with the conventional arrangement in which no known signal is inserted as the last symbol of each burst, and equalization performance similar to those obtained when a known signal is inserted as the last symbol of each burst can be obtained. Since the last symbol of each burst can be used to transmit information, the bust transmission efficiency can be improved accordingly.

FIG. 20 shows an arrangement in which the sampling period of the sampling circuit 11-1 in FIG. 11 is set to a fractional symbol-spacing to replace the estimation error operation circuit 11-2 with a circuit having a different arrangement. In this arrangement, a sampled signal is input through an input terminal 20-1. A case wherein a sampling period T/2 is set will be exemplified. A Viterbi algorithm circuit 11-3 corresponding to a state estimating means outputs a code sequence S corresponding to each state transition and a code sequence P corresponding to the path of each state transition to signal generating circuits 20-5 and 20-6. The signal generating circuits 20-5 and 20-6 respectively generate symbol sequences corresponding to the input code sequences. Modulation wave reproducing circuits 20-7 and 20-8 filter the outputs from the signal generating circuits 20-5 and 20-6 to generate modulation waves at every sampling period. In this case, the signal generating circuits 20-5 and 20-6 and the modulation wave reproducing circuits 20-7 and 20-8 correspond to a signal generating means. The reproduced modulation wave obtained at every sampling period is input to a fractional tap-spacing transversal filter 20-13. The fractional tap-spacing transversal filter 20-13 performs convolution of a tap coefficient and the reproduced modulation wave to output an estimated signal. Note that if a reproduced modulation wave coinciding with a transmission signal is input to the fractional tap-spacing transversal filter 20-13, an estimated signal almost equal to the sampled signal is output. The estimated signal is input to a subtracting circuit 20-9. As a result, an estimation error signal $\alpha(i_f)$ is obtained every sampling period on the basis of the difference between the estimated signal and the sampled signal. Note that $i_f=0, \frac{1}{2}, 1, 3/2, \ldots$. A squaring circuit 20-10 calculates the square of the estimation error signal, multiplies the square by $-1$, and outputs the product. A metric circuit 20-11 serves to convert the squares of two estimation error signals, output per symbol, into one branch metric per symbol. As such a conversion method, various methods can be considered, e.g., a method of properly weighting $\alpha(i)$ and $\alpha(i-\frac{1}{2})$ and combining the resultant values. In this case, as a branch metric at time i, for example, $-\{|\alpha(i)|^2+|\alpha(i-\frac{1}{2})|^2\}$ is calculated and output. The output from the metric circuit 20-11 is input to the Viterbi algorithm circuit 11-3 shown in FIG. 11. A control circuit 20-12 performs the impulse response estimation by the RLS algorithm using the output from the modulation wave reproducing circuit 20-8 and the sampled signal delayed by a delay circuit 20-14 by a predetermined amount so as to minimize the magnitude of the estimation error signal, thereby setting the resultant priori estimated coefficient vector, as a tap coefficient, in the fractional tap-spacing transversal filter 20-13. In this case, the control circuit 20-12 corresponds to a control means.

FIG. 21 shows the arrangement of the fractional tap-spacing transversal filter 20-13. FIG. 21 shows a case wherein the sampling period is T/2, the delay time of a delayed wave is 1T or less than 1T, and the number of taps is 3. An output from the modulation wave reproducing circuit 20-7 is represented by $b(i_f)$. The output $b(i_f)$ is input through an input terminal 21-0. Each of delay circuits 21-1 and 21-2 delays the input by T/2. The value $b(i_f)$ is set in a multiplying circuit 21-3; a value $b(i_f-e, \text{fra } 1/2\times)$, a multiplying circuit 21-4; and a value $b(i_f-1)$, a multiplying circuit 21-5. In addition, priori estimated coefficient vectors are set, as tap coefficients w0, w1, and w2, in the multiplying circuits 21-3, 21-4, and 21-5, respectively. The products from the respective multiplying circuits are summed up together by an adder 21-6 and the sum is output from an output terminal 21-7.

Operations of the modulation wave reproducing circuits 20-7 and 20-8 will be described below by exemplifying a case wherein root roll-off filters are used for transmission and reception filters. In this case, each of the modulation wave reproducing circuits 20-7 and 20-8 serves as a roll-off filter, and its output $b(i_f)$ is obtained by sampling a roll-off filter output at the sampling period T/2. The output $b(i_f)$ is represented by $$b(i_f) = \sum_K h_R[(i_f - k)T]a_m(k) \tag{14}$$

where $h_R(t)$ is the impulse response of a cosine roll-off filter. The value $h_R(t)$ satisfies the Nyquist condition and is given by $$h_R(kT) = \begin{cases} 1 & k = 0 \\ 0 & R \neq 0 \end{cases} \tag{15}$$

Therefore, when $i_f$ is an integer, $b(i_f)$ becomes $a_m(i)$. However, when $i_f$ is not an integer, $b(i_f)$ must be calculated by using equation (14). Since the value $b(i_f)$ is dependent on infinite past and future values $a_m(i)$, the value cannot be accurately obtained. However, in consideration of the fact that the value $h_R(t)$ is attenuated as it becomes apart from the origin, the value $b(i_f)$ is approximated as follows by using only adjacent complex amplitudes in order to reduce the operation amount:

$$b(i+\tfrac{1}{2}) = h_R(T/2)a_m(i) + h_R(-t/2)a_m(i+1) \tag{16}$$

The relationship between fractional symbol-spacing sampling and equalization performances will be described below by exemplifying a received signal waveform having the sampling period T/2 and having no waveform distortion and noise with reference to FIGS. 22 to 24. When the timing offset of a timing clock is 0, sampling is performed at each time point indicated by "sampling 1" in FIG. 22. If the timing offset is T/4, sampling is performed at each time point indicated by "sampling 2" in FIG. 22. FIGS. 23 and 24 respectively show waveforms reproduced by a sampling function with the sampling period T/2 at "sampling 1" and "sampling 2". It is apparent that even if there is a timing offset, the original waveform can be accurately reproduced. Such accurate reproduction can be achieved for the following reason. Since the sampling period T/2 is set, even if folding is caused at the Nyquist frequency 1/T, a sampled wave includes no frequency components having the frequency 1/T or more, and no folded distortion is caused. As described above, even if there is a timing offset, a sampled value obtained by fractional symbol-spacing sampling does not degrade. Therefore, in the arrangement of the embodiment described above, in which a sampled signal is obtained by fractional symbol-spacing sampling, a reproduced modulation wave is generated at every fractional symbol-spacing, and the sampled signal and the modulation wave can be compared with each other at every fractional tap-spacing, even if there is a timing offset, excellent equalization performance can be obtained.

Figure 25:
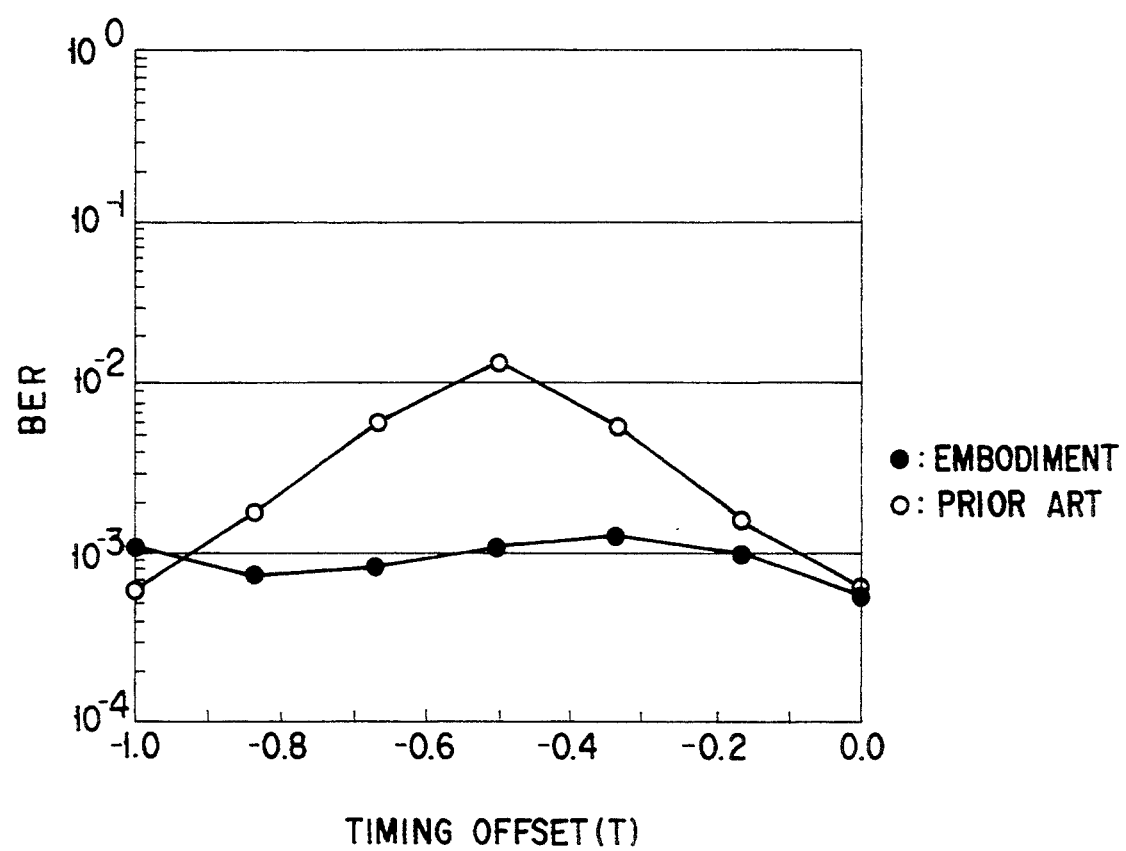
FIG. 25 is a graph showing an average bit error performance obtained when another limitation is imposed on the signal generating means in the apparatus of the embodiment in FIG. 11.

In order to confirm the effect of the present invention, computer simulations were performed. FIG. 25 shows the results. In the simulations, QPSK modulation with a roll-off ratio of 0.5 was used as a modulation scheme, a static single path model was used as a radio transmission model, and $E_b/N_o = 8$ dB. The RLS algorithm was used to perform impulse response estimation, while forgetting factors of 0.8 and 0.9 were respectively set for the prior art and the present invention. Referring to FIG. 25, dots and circles respectively indicate the results obtained by the embodiment and the prior art.

As is apparent from these results, the embodiment can suppress a degradation caused by a timing offset as compared with the prior art.

Figure 26:
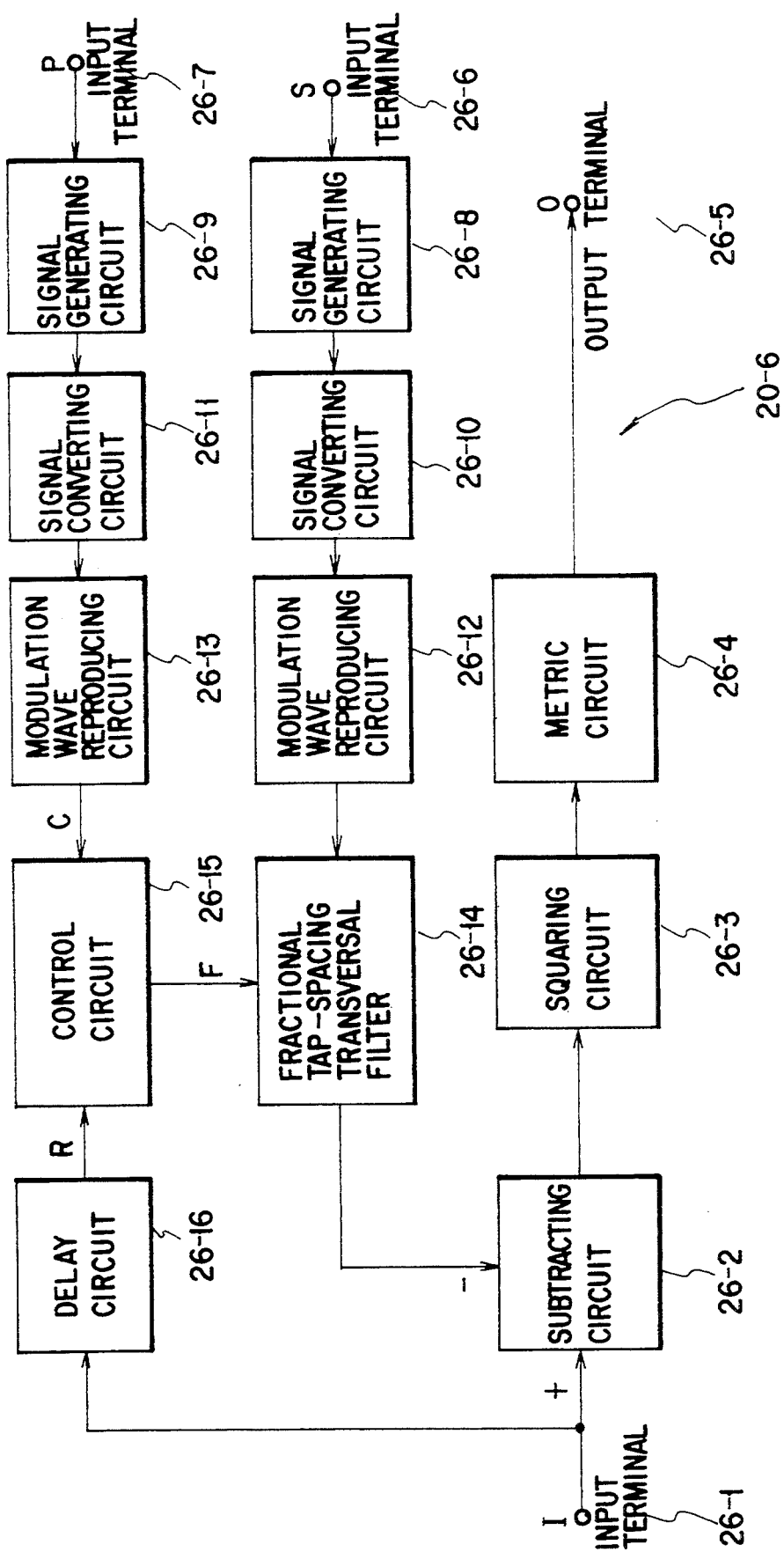
FIG. 26 is a block diagram showing still another arrangement of the estimation error operation circuit in the apparatus of the embodiment in FIG. 11.

An estimation error operation circuit 26-0 shown in FIG. 26 exemplifies another arrangement of the estimation error operation circuit 11-2 in the arrangement of the apparatus shown in FIG. 11.

This estimation error operation circuit 26-0 is different from the estimation error operation circuit 20-0 shown in FIG. 20 in that signal converting circuits 26-10 and 26-11 are respectively inserted between a signal generating circuit 26-8 and a modulation wave reproducing circuit 26-12 and between a signal generating circuit 26-9 and a modulation wave reproducing circuit 26-13.

These signal converting circuits 26-10 and 26-11 are identical to the signal converting circuits 16-7 and 16-8 in FIG. 16. Therefore, errors at the last symbols of bursts can be reduced.

Figure 27:
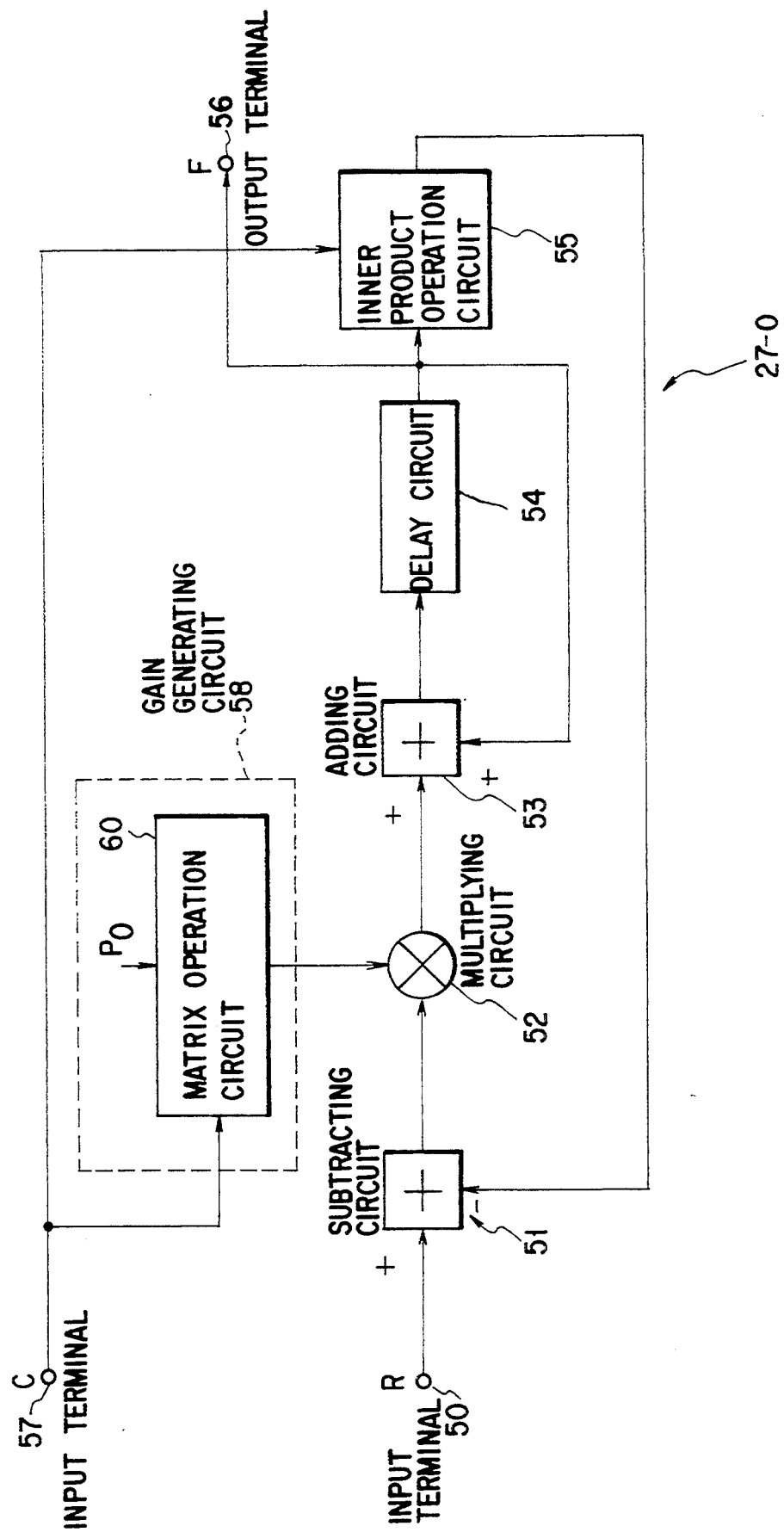
FIG. 27 is a block diagram showing an arrangement of a control circuit 12-4, shown in FIG. 12, in an estimation error operation circuit 11-2 in the apparatus of the embodiment shown in FIG. 11.

A control circuit shown in FIG. 27 exemplifies a circuit arrangement of the control circuit 12-4 shown in FIG. 12 as a component of the estimation error operation circuit 11-2 in the apparatus shown in FIG. 11. Note that the same reference numerals in FIG. 27 showing the control circuit 27-0 denote the same parts as in FIG. 5 showing the control circuit 412. The control circuit 27-0 shown in FIG. 27 performs the impulse response estimation by using the above-described RLS algorithm.

In this case, a symbol sequence corresponding to a state transition, input through an input terminal 57, is represented by a K-dimensional vector $N_m(i)$ as follows:

$$N_m(i) = [a_m(i) a_m(i-1) \ldots a_m(i-k+1)] \quad (18)$$

where $a_m(i)$ is a complex symbol candidate corresponding to each state transition. Note subscript "m" is used in place of subscript "d" in equation (9-a)–(9-d) in this case.

Since the RLS algorithm represented by equations (9-a) to (9-d) includes a matrix operation, the substantial numerical operation amount is increased almost in proportion to the square of a number of taps M. However, since a signal vector $N_m(i)$ input through the input terminal 57 has the output from a signal generating circuit 15-2 as elements, its autocorrelation matrix $P_m(i)$ is not dependent on a sampled signal y(i) and becomes a constant value after a sufficient period of time.

Therefore, by setting $P_m(i) = P_o$ instead of performing an update operation of the inverse matrix $P_m(i)$ according to equation (9-d), and utilizing that $P_m(i) = P_m(i)^{-1}$ $K_m(i)$ can be set from equations (9-a) and (9-d), the following equation can be used in place of equation (9-9):

$$K_m(i) = P_o N_m(i) \quad (19)$$

wherein $K_m(i)$ is a Kalman gain vector, and $P_o$ is a fixed matrix which can be logically obtained in advance from an ensemble average with respect to a received signal. In addition, the value of $P(i)$ at the end of training may be set as $P_o$.

The circuit arrangement shown in FIG. 27 is designed to use a fixed matrix operation in place of an inverse matrix operation in the above-described manner. In the control circuit 27-0, an inverse matrix operation circuit 59 of the control circuit 412 in FIG. 5 is replaced with the fixed matrix $P_o$.

As is apparent from the above description, a reduction in operation amount can be achieved.

A control circuit 28-0 shown in FIG. 28 exemplifies another arrangement of the control circuit 12-4 shown in FIG. 12 as a component of the estimation error operation circuit 11-2 in the apparatus of the embodiment shown in FIG. 11. The same reference numerals in FIG. 28 showing the control circuit 28-0 denote the same parts as in FIG. 5 showing the control circuit 412.

The control circuit 28-0 shown in FIG. 28 is different from the control circuit 27-0 shown in FIG. 27 in that a matrix operation circuit 28-1 is arranged between a delay circuit 54 and an inner product operation circuit 55, and a value obtained by multiplying a priori estimated coefficient vector by a transition matrix is output from an output terminal 56 instead of outputting a priori estimated coefficient vector.

The principle of an impulse response estimation algorithm in the control circuit 28-0 will be described below by exemplifying a signal z(t) represented by $$z(t) = s(t) + n_2(t) \quad (20)$$

where s(t) is a signal before a degradation is caused by noise, and $n_2(t)$ is a noise.

The difference between the conventional least squares method and the algorithm of the present invention will be described below with reference to a case wherein a value s(kT) is estimated on the basis of a sampled value z(i) which is obtained by sampling the signal z(t) at a sampling period T. Assume that datum substantially stored by the algorithm ranges from data at the current time point to data at a time point a time $\xi$ past the current time point, and datum before this time range is to be forgotten. This time $\xi$ is called a time constant.

In the conventional least squares method, the signal s(t) is assumed to be constant during the time constant $\xi$, and the value s(kT) is estimated by averaging $\{z(i)\}$ in an interval of $kT - \xi \leq t \leq kT$. FIG. 29 shows estimation processing performed by the least squares method with $\xi = 5T$. Referring to FIG. 29, a broken line indicates the trace of s(t), and each circle indicates the value of z(i). In this case, a one-dot, one dash line parallel to the abscissa indicates an estimated value $s_e'(kT)$ of s(kT). As is apparent from FIG. 29, the value $s_e'(kT)$ is the average value of z(i) in an interval of $kT - \xi \leq t \leq kT$. When $s\{(k+1)T\}$ is to be estimated, $\{z(i)\}$ in an interval of $(k+1)T - \xi \leq t \leq (k+1)T$ is averaged. Subsequently, this operation is repeated to estimate s(hT), $h = k + 2, \ldots$. It is apparent from FIG. 29 that if the time constant $\xi$ is decreased, the algorithm can follow variations in s(t) over time. If, however, the time constant $\xi$ is decreased too much, numerical divergence occurs, and some limitations are imposed on the tracking performances.

In the algorithm of the present invention, s(kT) is estimated by performing linear approximation in an interval of $kT - \mu \leq t \leq kT$, assuming that s(t) varies as a linear function during the time constant $\xi$. FIG. 30 shows estimation processing performed by the algorithm with $\xi = 5T$. Referring to FIG. 30, a broken line indicates the trace of s(t), and each circle indicates the value of z(i). In this case, an estimated curve is indicated by a one-dot, one-dash line. The value of this curve at $t = kT$ is an estimated value $s_e'(kT)$ of s(kT). When s{(k+1)T)} is to be estimated, linear approximation is performed in an interval of $(k+1)T-\xi \leq t \leq (k+1)T$, and the value of the curve at $t=(k+1)T$ is set as an estimated value. Subsequently, this operation is repeated to estimate s(hT), h=k+2, .... When FIGS. 29 and 30 are compared with each other, it is understood that the algorithm of the present invention is superior to the conventional least squares method in allowing accurate estimation when variations occur at high speed, and ensuring excellent tracking performance.

Furthermore, in the algorithm, by extrapolating an estimated curve, a signal at a future time point can be predicted. More specifically, if the current time point is represented by kT, and an estimated value at the current time point kT and an increase (the inclination of the curve) per time T are respectively represented by $s_e(kT)$ and $s_e^{(1)}(kT)$, a signal advanced by a time 1T from the current time point kT can be predicted as $s_e(kT)+s_e^{(1)}(kT)$. It is, however, assumed that the inclination of the curve is not changed. This operation will be expressed below by using a matrix. If a two-dimensional vector s(k) is set as $$s^H(k) = [s_e^{(1)*}(kT) s_o^*(kT)] \quad (21)$$

then, prediction of s(k) advanced by 1T from the current time, i.e., prediction of s(k+1) is equivalent to multiplaying S(k) by the following 2×2 matrix s:

$$s = \begin{bmatrix} 1 & 0 \\ 1 & 1 \end{bmatrix} \quad (22)$$

With this processing, only the estimated value of the signal is increased by $s_e^{(1)}(kT)$ without changing the inclination. Similarly, a signal advanced by a time LT from the current time can be predicted by multiplication processing of $s^L$.

This algorithm is applied to the impulse response estimation. More specifically, estimation is performed on the assumption that the impulse response of the transmission radio varies as a function of time in the manner of a linear function. Upon extension of equation (21), a posteriori estimated coefficient vector $X_{ext}(i)$ is expressed by a 2K-dimensional vector as follows:

$$\underline{H}_{ext}(i) = [w_m^{(1)*}(i)\ w_m^*(i)\ w_m^{(1)*}(i-1)\ w_m^{*(i-1)} \quad (23)$$
$$\ldots w_m^{(1)*}(i-K+1)\ w_m^*(i-K+1)]$$

where $w_m^{(1)}(i)$ is the time first order differential of the tap coefficient of the transversal filter 12-1, i.e., the time first order differential of the impulse response of the radio transmission radio. In order to calculate an estimated signal by performing an inner product operation of the posteriori estimated coefficient vector $ext(i)$, a symbol sequence corresponding to a state transition, input through the input terminal 57, is represented by a 2K-dimensional vector $ext(i)$ as follows:

$$ext^H(i) = [0 a_m(i) 0 a_m(i-K+1)] \quad (24)$$

In addition, equation (22) is extended, and a 2K×2K transition matrix is represented by $$_{k,l} = \begin{cases} 1 & (k = l) \\ 1 & (k = 2m,\ l = 2m-1, 2, \ldots) \\ 1 & \text{(others)} \end{cases} \quad (25)$$

where $_{kp}$ represents a matrix element of kth row and pth column of .

In the RLS algorithm, $_m(i-1)$ corresponds to a priori estimated coefficient vector. In the algorithm of the present invention, $ext(i-1)$ corresponds to a priori estimated coefficient vector. With this change, an algorithm for updating a priori estimated coefficient vector $ext(i)$ can be obtained by replacing the RLS algorithm represented by equations (9-a) to (9-d) as follows:

$$d(i) \rightarrow ext(i)$$
$$d(i-1) \rightarrow ext(i-1)$$
$$d(i) \rightarrow ext(i)$$
$$d(i) \rightarrow ext(i)$$
$$d(i-1) \rightarrow ext(i-1\ H \quad (26)$$

where $ext(i)$ is the inverse matrix of the autocorrelation matrix of $ext(i)$.

Simplification of the algorithm for updating the priori estimated coefficient vector $ext(i)$ will be described next. The value $ext(i)$ is not dependent on the sampled signal y(i) and becomes a constant value after a sufficient period of time. Therefore, by setting $$ext(i) = _o$$

instead of updating $ext(i)$, and utilizing that $$ext(i) = ext(i)\ ext(i)$$

approximation is performed as follows:

$$ext(i) = _o\ ext(i) \quad (27)$$

where $_o$ is a fixed matrix which can be theoretically obtained from an ensemble average with respect to a symbol signal. In addition, the value of $ext(i)$ at the end of training may be set as $P_o$.

In such a circuit arrangement, since the impulse response estimation is performed on the basis of the sampled signal y(i) which is not delayed, unlike the conventional arrangement, the impulse response of a transmission radio at the current time point can be estimated. In addition, since the impulse response estimation is performed by the adaptive algorithm with excellent tracking performances, the tracking performances are improved to achieve a great improvement in equalization performance.

Note that the algorithm has been described above on the assumption that the impulse response of a radio transmission linearly varies as a function of time. However, even if it is assumed that the impulse response varies as a parabolic function or a higher order function, the algorithm can easily follow such variations by changing $ext(i)$, $ext(i)$, and the transition matrix .

FIG. 31 is a graph for explaining the effect of the apparatus shown in FIG. 11 which has the estimation error operation circuit 11-2 using the control circuit 28-0 shown in FIG. 28. More specifically, FIG. 31 shows average bit error rate performances (BER) with respect to an average $E_b/N_o$, which were obtained by computer simulations. The simulation conditions were set as follows: a modulation scheme was the QPSK scheme; a transmission rate, 40 kb/s; a maximum Doppler frequency, 160 Hz; and a radio transmission model, a two-path Rayleigh fading model with a two-path delay time difference 1T. Referring to FIG. 31, rectangles indicate the performance obtained by the arrangement of the present invention, and dots indicate the performance obtained by the conventional arrangement. According to the present invention, since the impulse response of a radio transmission at the current time point is estimated, and the impulse response estimation is performed by the adaptive algorithm with excellent tracking performances, the apparatus can track variations in the impulse response at high speed, and the equalization performances are greatly improved as compared with the conventional method, as is apparent from the graph.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of equalization in an impulse response of mobile transmission which varies fast in mobile radio communication, comprising the steps of:

receiving a quasi-coherent demodulated signal, sampling said received quasi-coherent demodulated signal, and outputting a sampled signal obtained at a sampling period;

receiving both a code sequence corresponding to each state transition which occurs at a predetermined period and a code sequence corresponding to a path of said each state transition, and generating both a signal sequence corresponding to said each state transition and a signal sequence corresponding to the path of said each state transition by modulating said code sequence corresponding to said state transition and said code sequence corresponding to the path of said state transition, respectively;

receiving the signal sequence corresponding to said each state transition, and outputting an estimated signal for each said state transition by using an adaptive filter which comprises a transversal filter having a priori estimated coefficient vector as a tap coefficient;

receiving a branch metric for each said state transition, obtained by using a square of an estimation error obtained by subtracting the estimated signal for each said state transition from the sampled signal, estimating a state sequence corresponding to a maximum likelihood code sequence by using a Viterbi algorithm which regards code sequences as state sequences and paths, updating the code sequences as said state transitions, and outputting Said maximum likelihood code sequence as a decision, the code sequence corresponding to each said state transition, and the code sequence corresponding to the path of each said state transition; and performing control to update the priori estimated coefficient vector by adding a calculation value, as a correction term, to the prior estimated coefficient vector, the step of performing control including the step of obtaining the correction term as said calculation value which includes a step of obtaining an operation value by performing an inner product operation between the signal sequence corresponding to the path of each said state transition and the priori estimated coefficient vector as a basic value for the estimated signal, and calculating a priori estimation error by subtracting the operation value from the sampled signal which has undergone a predetermined delay operation, and a step of calculating a Kalman gain vector by performing an inverse matrix operation on the basis of the signal sequence corresponding to the path of each said state transition, and generating said correction term by multiplying the priori estimation error by the Kalman gain vector.

2. A method according to claim 1, wherein:

said receiving step which receives said quasi-coherent demodulated signal further comprises outputting a sampled signal obtained at a sampling period for each diversity branch, and said branch metric is obtained by using a square of an estimation error obtained by subtracting an estimated signal for each state transition from said sampled signal for said each diversity branch.

3. An apparatus for equalization in the impulse response of mobile transmission which varies fast in mobile radio communication, the apparatus comprising:

receiving means including a sampling circuit for receiving a quasi-coherent demodulated signal, and for outputting a sampled signal obtained at a sampling period;

signal generating means for receiving both a code sequence corresponding to each state transition which occurs at a predetermined period and a code sequence corresponding to a path of said each state transition, and generating both a signal sequence corresponding to said each state transition and a signal sequence corresponding to the path of said each state transition by modulating said code sequence corresponding to said each state transition and said code sequence corresponding to the path of said each state transition, respectively;

adaptive filter means, including a transversal filter having a tap coefficient and connected to said signal generating means, for receiving the signal sequence corresponding to each said state transition, and for outputting an estimated signal for each state transition;

state estimating means for:

receiving a branch metric for each said state transition, obtained by a branch metric operation circuit using a square of an estimation error obtained by subtracting the estimated signal for each said state transition from the sampled signal, estimating a state sequence corresponding to a maximum likelihood code sequence by using a Viterbi algorithm which regards code sequences as state sequences and paths, and updating the code sequences as said state transitions, and outputting said maximum likelihood code sequence as a decision, the code sequence corresponding to each said state transition, and the code sequence corresponding to the path of each said state transition; and control means for performing an RLS algorithm for obtaining a prior estimation error by subtracting an inner product operation value, obtained by performing an inner product operation between the signal sequence corresponding to the path of said each state transition and the tap coefficient, from the sampled signal which has undergone a predetermined delay operation, and for updating the tap coefficient by adding a product, obtained by multiplying the priori estimation error by a Kalman gain vector, obtained by performing a matrix operation of the signal sequence corresponding to the path of said each state transition, as a correction term to the tap coefficient.

4. An apparatus according to claim 3, wherein:

said sampling circuit of said receiving means has a sampling period for each diversity branch, and said branch metric operation circuit calculates and outputs said branch metric for said each state transition respectively by using a square of an estimation error obtained by subtracting an estimated signal for each state transition from said sampled signal for said each diversity branch.

5. An apparatus according to claim 4, wherein said signal generating means outputs symbol sequences as both said signal sequence corresponding to said each state transition and said signal sequence corresponding to the path of said each state transition by modulating both said code sequence corresponding to said each state transition and said code sequence corresponding to the path of said each state transition which said state estimating means outputs until a last time point of a burst, and outputs estimated symbol sequences from a time point corresponding to a last symbol of a burst to a time point extended by an amount $(K-1)$ times a symbol period T, provided that K represents a constraint length defining the state transition.

6. An apparatus according to claim 4, wherein:

said sampling circuit of said receiving means has a sampling period less than a symbol period for each diversity branch, said signal generating means comprises a circuit for converting both said code sequence corresponding to said each state transition and said code sequence corresponding to the path of said each state transition into modulation wave sequences, said adaptive filter means comprises a fractional tap-spacing transversal filter, and said branch metric operation circuit comprises a circuit means for converting squares of the estimation error per sampling into the branch metric per symbol.

7. An apparatus according to claim 6, wherein said signal generating means outputs a modulation wave sequences as said signal sequence corresponding to each state transition and said signal sequence corresponding to the path of each state transition by modulating both said code sequence corresponding to said each state transition and said code sequence corresponding to the path of said each state transition which said state estimating means outputs until a last time point of a burst, and outputs estimate modulation wave symbol sequences from a time point corresponding to a last symbol of a burst to a time point extended by an amount $(K-1)$ times a symbol period T, provided that K represents a constraint length defining the state transition.

8. An apparatus according to claim 3, wherein said signal generating means outputs symbol sequences as both said signal sequence corresponding to said each state transition and said signal sequence corresponding to the path of said each state transition by modulating both said code sequence corresponding to said each state transition and said code sequence corresponding to the path of said each state transition which said state estimating means outputs until a last time point of a burst, and outputs estimated symbol sequences from a time point corresponding to a last symbol of a burst to a time point extended by an amount $(K-i)$ times a symbol period T, provided that K represents a constraint length defining the state transition.

9. An apparatus according to claim 3, wherein:

said sampling circuit of said receiving means has a sampling period less than a symbol period, said signal generating means comprises a circuit for converting both said code sequence corresponding to said each state transition and said code sequence corresponding to the path of said each state transition into modulation wave sequences, said adaptive filter means comprises a fractional tap spacing transversal filter, and said branch metric operation circuit comprises a circuit means for converting squares of the estimation error per sampling into the branch metric per symbol.

10. An apparatus according to claim 9, wherein said signal generating means outputs modulation wave sequences as said signal sequence corresponding to each state transition and said signal sequence corresponding to the path of each state transition by modulating both said code sequence corresponding to said each state transition and said code sequence corresponding to the path of said each state transition which said state estimating means outputs until a last time point of a burst, and outputs estimate modulation wave symbol sequences from a time point corresponding to a last symbol of a burst to a time point extended by an amount $(K-1)$ times a symbol period T, provided that K represents a constraint length defining the state transition.

11. An apparatus according to claim 3, wherein said control means obtains the Kalman gain vector by performing an inverse matrix operation of the signal sequence corresponding to the path of each state transition.

12. An apparatus according to claim 3, wherein said control means obtains the Kalman gain vector by performing a fixed matrix operation of the signal sequence corresponding to the path of each state transition.

13. An apparatus according to claim 3, wherein the tap coefficient of said transversal filter of said adaptive filter means comprises a priori estimated coefficient vector.

14. An apparatus according to claim 3, wherein the tap coefficient of said transversal filter of said adaptive filter means comprises a product of a priori estimated coefficient vector and a transition matrix.

* * * * *

UNITED STATES PATENT AND TRADEMARK OFFICE
CERTIFICATE OF CORRECTION

PATENT NO. : 5,436,928
DATED : July 25, 1995
INVENTOR(S) : Kazuhiko Fukawa et al.

It is certified that error appears in the above-identified patent and that said Letters Patent is hereby corrected as shown below:

Title page,
Item [75] Inventors: change "Fukuawa" to -- Fukawa --;

Item [56] References Cited, under "OTHER PUBLICATIONS", page 2, line 6, change "No. 134" to -- No. 19 --.

Signed and Sealed this

Nineteenth Day of March, 2002

Attest:

JAMES E. ROGAN
*Attesting Officer*  *Director of the United States Patent and Trademark Office*